(12) United States Patent
Donnelly et al.

(10) Patent No.: US 9,739,419 B2
(45) Date of Patent: Aug. 22, 2017

(54) MULTI-FUEL SERVICE STATION

(71) Applicant: RHT Railhaul Technologies, North Vancouver (CA)

(72) Inventors: Frank Wegner Donnelly, North Vancouver (CA); David William Dewis, North Hampton, NH (US); John D. Watson, Evergreen, CO (US)

(73) Assignee: RHT RAILHAUL TECHNOLOGIES, North Vancouver BC (CA)

( * ) Notice: Subject to any disclaimer, the term of this patent is extended or adjusted under 35 U.S.C. 154(b) by 0 days.

(21) Appl. No.: 15/069,685

(22) Filed: Mar. 14, 2016

(65) Prior Publication Data

US 2016/0195220 A1 Jul. 7, 2016

Related U.S. Application Data

(62) Division of application No. 13/656,048, filed on Oct. 19, 2012, now Pat. No. 9,284,178.

(Continued)

(51) Int. Cl.
*F17C 5/06* (2006.01)
*B67D 7/04* (2010.01)
*B60S 5/02* (2006.01)

(52) U.S. Cl.
CPC ...... *F17C 5/06* (2013.01); *B60S 5/02* (2013.01); *B67D 7/04* (2013.01);

(Continued)

(58) Field of Classification Search
CPC ..... B67D 7/00; B60S 5/02; F17C 5/00; F17C 6/00
See application file for complete search history.

(56) References Cited

U.S. PATENT DOCUMENTS 4,509,333 A 4/1985 Nussdorfer et al.
5,301,723 A * 4/1994 Goode ............... F17C 5/02 141/11

(Continued)

FOREIGN PATENT DOCUMENTS

EP 1760388 3/2007

OTHER PUBLICATIONS

Stodolsky, et al., "Analysis of Technology Options to Reduce the Fuel Consumption of Idling Trucks," Argonne National Laboratory, ANL/ESD-43, Jun. 2000, 40 pages.

(Continued)

*Primary Examiner* — Timothy L Maust
(74) *Attorney, Agent, or Firm* — Sheridan Ross P.C.

(57) ABSTRACT

A method and system(s) are disclosed for integrating a new fuel into an operating transportation system in a continuous, seamless manner, such as diesel fuel being gradually replaced by compressed natural gas ("CNG") in long haul trucks. Integration can be implemented using two enabling technologies. The first is an engine system capable of operating seamlessly on two or more fuels without regard to the ignition characteristics of the fuels. The second is a communications and computing system for implementing a fueling strategy that optimizes fuel consumption, guides the selection of fuel based upon location, cost and emissions and allows the transition from one fuel to another to appear substantially seamless to the truck driver.

6 Claims, 7 Drawing Sheets

Related U.S. Application Data

(60) Provisional application No. 61/549,342, filed on Oct. 20, 2011.

(52) U.S. Cl.
CPC ...... *F17C 2201/0109* (2013.01); *F17C 2201/054* (2013.01); *F17C 2203/0629* (2013.01); *F17C 2205/0146* (2013.01); *F17C 2205/0323* (2013.01); *F17C 2205/0352* (2013.01); *F17C 2221/012* (2013.01); *F17C 2221/013* (2013.01); *F17C 2221/014* (2013.01); *F17C 2221/033* (2013.01); *F17C 2221/037* (2013.01); *F17C 2223/0123* (2013.01); *F17C 2223/0161* (2013.01); *F17C 2223/033* (2013.01); *F17C 2223/036* (2013.01); *F17C 2225/0123* (2013.01); *F17C 2227/0135* (2013.01); *F17C 2227/0157* (2013.01); *F17C 2227/043* (2013.01); *F17C 2250/0443* (2013.01); *F17C 2270/0139* (2013.01); *F17C 2270/0171* (2013.01); *F17C 2270/0184* (2013.01); *Y02E 60/321* (2013.01)

(56) References Cited

U.S. PATENT DOCUMENTS

| | | | |
|---|---|---|---|
| 5,315,831 A | 5/1994 | Goode et al. | |
| 5,329,757 A | 7/1994 | Faulkner et al. | |
| 5,406,988 A * | 4/1995 | Hopkins | F17C 7/00 123/527 |
| 5,409,046 A | 4/1995 | Swenson et al. | |
| 5,450,724 A | 9/1995 | Kesseli et al. | |
| 5,488,823 A | 2/1996 | Faulkner et al. | |
| 5,505,232 A | 4/1996 | Barclay | |
| 5,564,270 A | 10/1996 | Kesseli et al. | |
| 5,586,429 A | 12/1996 | Kesseli et al. | |
| 5,609,655 A | 3/1997 | Kesseli et al. | |
| 5,771,947 A * | 6/1998 | Kountz | F17C 5/06 137/80 |
| 5,884,675 A * | 3/1999 | Krasnov | F17C 5/06 141/18 |
| 5,970,786 A * | 10/1999 | Smith | F17C 5/007 141/4 |
| 5,983,992 A | 11/1999 | Child et al. | |
| 5,992,139 A | 11/1999 | Kesseli | |
| 6,182,710 B1 | 2/2001 | Webb | |
| 6,305,079 B1 | 10/2001 | Child et al. | |
| 6,574,950 B2 | 6/2003 | Nash | |
| 6,598,400 B2 | 7/2003 | Nash et al. | |
| 6,601,392 B2 | 8/2003 | Child | |
| 6,619,336 B2 | 9/2003 | Cohen et al. | |
| 6,810,925 B2 * | 11/2004 | Graham | B60S 5/02 141/18 |
| 6,895,760 B2 | 5/2005 | Kesseli | |
| 6,897,578 B1 | 5/2005 | Olsen et al. | |
| 6,968,702 B2 | 11/2005 | Child et al. | |
| 7,059,364 B2 * | 6/2006 | Kountz | F17C 9/02 141/197 |
| 7,069,730 B2 | 7/2006 | Emmer et al. | |
| 7,128,103 B2 * | 10/2006 | Mitlitsky | H01M 8/04089 141/197 |
| 7,152,637 B2 * | 12/2006 | Hoke, Jr. | F17C 5/007 141/192 |
| 7,284,575 B2 | 10/2007 | Gram et al. | |
| 7,325,401 B1 | 2/2008 | Kesseli et al. | |
| 7,393,179 B1 | 7/2008 | Kesseli et al. | |
| 7,523,770 B2 | 4/2009 | Horowitz et al. | |
| 7,938,150 B2 * | 5/2011 | Handa | F17C 5/007 141/285 |
| 7,966,868 B1 | 6/2011 | Sonnichsen et al. | |
| 8,015,812 B1 | 9/2011 | Kesseli et al. | |
| 8,122,918 B2 * | 2/2012 | Handa | F17C 5/00 141/192 |
| 8,215,378 B2 | 7/2012 | Nash et al. | |
| 8,371,365 B2 | 2/2013 | Kesseli et al. | |
| 8,418,732 B2 * | 4/2013 | Cohen | G05D 11/132 141/107 |
| 8,499,874 B2 | 8/2013 | Dewis et al. | |
| 8,783,307 B2 * | 7/2014 | Ding | F17C 5/007 141/197 |
| 9,284,178 B2 | 3/2016 | Donnelly et al. | |
| 2005/0178463 A1 | 8/2005 | Kountz et al. | |
| 2007/0144605 A1 | 6/2007 | Horowitz et al. | |
| 2009/0211260 A1 | 8/2009 | Kesseli et al. | |
| 2011/0288738 A1 | 11/2011 | Donnelly et al. | |
| 2012/0000204 A1 | 1/2012 | Kesseli et al. | |
| 2012/0216915 A1 * | 8/2012 | Takata | F17C 5/06 141/82 |
| 2015/0013831 A1 | 1/2015 | Boyer | |

OTHER PUBLICATIONS

International Search Report and Written Opinion for International (PCT) Application No. PCT/US2012/061014, mailed Feb. 26, 2013, 11 pages.

International Preliminary Report on Patentability for International (PCT) Application No. PCT/US2012/061014, mailed Apr. 22, 2014, 8 pages.

Official Action for U.S. Appl. No. 13/656,048, mailed Feb. 13, 2015, 6 pages, Restriction Requirement.

Official Action for U.S. Appl. No. 13/656,048, mailed Apr. 29, 2015, 18 pages.

Notice of Allowance for U.S. Appl. No. 13/656,048, mailed Nov. 9, 2015, 5 pages.

\* cited by examiner

MULTI-FUEL SERVICE STATION

CROSS REFERENCE TO RELATED APPLICATION

This application is a divisional of co-pending U.S. patent application Ser. No. 13/656,048, entitled "Multi-Fuel Service Station" filed Oct. 19, 2012, which claims the benefits, under 35 U.S.C. §119(e), of U.S. Provisional Application Ser. No. 61/549,342 entitled "Multi-Fuel Service Station" filed Oct. 20, 2011, each of which are incorporated herein by reference in their entireties.

FIELD

The present disclosure relates generally to a service station strategy for multi-fuel vehicles wherein either or both of liquid and gaseous fuels are dispensed.

BACKGROUND

Multi-fuel vehicles are known. For example, cars with spark-ignition engines (Otto cycle) have been outfitted with natural gas and propane fuel capability so that they can run on gasoline, or switch and run on either natural gas or propane. These engines can be switched on the fly (that is when the engine is running and the vehicle is in motion). There is, however, a limitation on this multi-fuel capability since the fuels must have comparable ignition characteristics. The fuels must have a high enough octane rating such that they are ignited as prescribed by the spark ignition system and not pre-ignited such as by compression or hot surfaces before the prescribed spark ignition.

Some trucks are available with diesel engines (Diesel cycle) and can run on diesel fuel or a mixture of diesel fuel and natural gas fuel. In the latter case, the natural gas is the predominant fuel and the diesel fuel is utilized as an ignition fuel. Unlike natural gas fuel, diesel fuel has excellent compression ignition characteristics but the combination of diesel fuel and natural gas fuel can be made to combust at the prescribed time of the combustion cycle.

Some fuels, such as gasoline and diesel fuel, are widely available for use in vehicles through a well-developed distribution infrastructure. These fuels are well characterized in terms of ignition characteristics, cost, energy content and emissions.

Other fuels, such as natural gas, bio-diesel, ethanol, methanol, butanol, propane and hydrogen, are less readily available for use in vehicles but may have cost and emissions advantages over the widely available fuels.

For example, there is a distribution infrastructure for natural gas though this infrastructure is less developed for vehicles than for distribution to fixed commercial users. Both liquefied natural gas ("LNG") and compressed natural gas ("CNG") forms of natural gas are available to vehicles as fuels on a limited basis. Refueling an LNG-powered vehicle is often problematic since it requires special equipment and special procedures, which are not always convenient for vehicle operators.

There is currently a very limited infrastructure for hydrogen fuel. However, if hydrogen fuels were available, they would have excellent emissions characteristics (no greenhouse carbon emissions at the point of use). As with natural gas, refueling would require special equipment and special procedures, which may not be convenient for vehicle operators.

The problem faced by developers of any new fuel is that they require a widely available distribution infrastructure for a new fuel to become accepted. However, the costs and risks of installing such an infrastructure may be too great until acceptance of the new fuel can be demonstrated. In addition, the introduction of a new fuel will inconvenience vehicle operators if the new fuel requires new procedures and/or new equipment or is not readily available.

There therefore remains a need for innovative strategies for introducing and dispensing new fuels for vehicles that can operate on any of several fuels where such introduction does not depend on a pre-existing well-developed distribution infrastructure and where such introduction can be made seamless to the vehicle operator.

SUMMARY

These and other needs are addressed by the various embodiments and configurations of the present disclosure which are directed generally to a service station dispensing strategy for multi-fuel vehicles.

The present disclosure describes a method and enabling apparatuses for integrating a new fuel into an operating transportation system in a continuous, seamless manner. This method is illustrated by the example of diesel fuel being gradually replaced by compressed natural gas ("CNG") fuel in long haul trucks. As can be appreciated, this approach can be used for diesel fuel and liquid natural gas ("LNG") as well as other fuels as they are developed, characterized, mass produced and eventually distributed. The method described herein overcomes the risk associated with developing a new fuel when there is little or no fuel distribution infrastructure in place.

Integrating a new fuel into an existing transportation situation (for example, introducing CNG to a long haul truck fleet) can be implemented using two enabling technologies. The first is an engine system capable of operating seamlessly on two or more fuels without regard to the ignition characteristics of the fuels. The second is a communications and computing system for implementing a fueling strategy that optimizes fuel consumption, guides the selection of fuel based upon location, cost and emissions and allows the transition from one fuel to another to appear substantially seamless to the truck driver.

Such a system is described in U.S. patent application Ser. No. 13/090,104 entitled "Multi-Fuel Vehicle Strategy" which is incorporated herein by reference.

A compact, high-performance gas turbine engine is one of a number of enabling technologies of the above strategy. The gas turbine engine has an advantage over reciprocating internal combustion engines, such as for example diesel engines, in that a gas turbine engine can typically burn a variety of fuels without regard for ignition characteristics and with little or no modification to the fuel injection system when switching from fuel to fuel. This is because the combustion process of a gas turbine engine is substantially continuous, requiring primarily a certain level of specific energy not special ignition characteristics from its fuels. Therefore, gas turbine engines are well-suited for multi-fuel operation.

In a first embodiment, a fuel dispensing facility is disclosed that includes a first plurality of liquid fuel dispensing lanes, each lane comprising a liquid fuel dispensing assembly to pump liquid fuel into a liquid fuel receptacle in a vehicle and a second plurality of compressed gaseous fuel dispensing lanes, each lane comprising a gaseous fuel dispensing assembly to introduce gaseous fuel into a gaseous fuel receptacle in a vehicle, the plurality of gaseous fuel dispensing assemblies having at least the following operating modes: 1) a slow-fill mode in which the gaseous fuel is pressurized, over a slow-fill period, from a lower pressure to a maximum pressure of the vehicle's gaseous fuel receptacle; and 2) a rapid-fill mode in which the gaseous fuel is expanded, over a rapid-fill period, from a higher pressure source to a maximum pressure of the vehicle's gaseous fuel receptacle.

In a second embodiment, a fuel dispensing facility is disclosed that includes a first plurality of liquid fuel dispensing lanes, each lane comprising a liquid fuel dispensing assembly to pump liquid fuel into a liquid fuel receptacle in a customer's vehicle and a second plurality of compressed gaseous fuel dispensing lanes, each lane comprising a compressed gaseous fuel dispensing assembly to introduce gaseous fuel into a gaseous fuel fuel receptacle in a customer's vehicle, a method comprising: 1) providing, by a slow-fill mode in which the gaseous fuel is pressurized, over a slow-fill period, from a lower pressure to a maximum pressure of a receiving gaseous fuel receptacle, gaseous fuel to a gaseous fuel receptacle of a first vehicle; 2) providing, by a rapid-fill mode in which the gaseous fuel is expanded, over a rapid-fill period, from a higher pressure source to a maximum pressure of a receiving gaseous fuel receptacle, gaseous fuel to a gaseous fuel receptacle of a second vehicle; and 3) providing by a liquid fuel dispensing assembly liquid fuel to the liquid fuel receptacle of at least one of the first and second vehicle and a third vehicle.

In a third embodiment, a system is disclosed for fueling a vehicle, comprising a billing module operable to determine a cost of fuel dispensed to each of a plurality of fueled vehicles; one of one or more fuel-containing vessels; one or more compressors; a plurality of fueling posts; one or more manifolds; one or more flow meters; one or more transmission pipelines in fluid communication with the one or more fuel-containing vessels, the plurality of fueling posts, the one or more manifolds, the one or more flow meters, and the one or more compressors; wherein: 1) in response to a request for fuel, the fuel is dispensed to a vehicle from a selected one of the plurality of fueling posts; 2) an amount of fuel dispensed at any of the plurality of fueling posts is determined by the one or more flow meters, the flow meters being operatively connected to the billing module; and 3) each of the plurality of fueling posts is located in or adjacent to a vehicle parking space that is free of a catchment system for spilled fuel.

In a fourth embodiment, a method for fueling a vehicle is disclosed comprising at a selected fueling post, dispensing a fuel to a parked vehicle, wherein the fuel is dispensed from a fueling system, the fueling system comprising one of one or more fuel-containing vessels, one or more transmission pipelines, one or more compressors, and one or more manifolds, operatively connected to the selected fueling post; measuring, by one or more flow meters, an amount of fuel dispensed to the parked vehicle; and determining, based on the amount of dispensed fuel, a cost to be paid by an operator of the parked vehicle, wherein an area around a location of fueling of the parked vehicle is free of a ground catchment system for spilled fuel.

These and other advantages will be apparent from the disclosures contained herein.

The above-described embodiments and configurations are neither complete nor exhaustive. As will be appreciated, other embodiments of the disclosure are possible utilizing, alone or in combination, one or more of the features set forth above or described in detail below.

The following definitions are used herein:

The phrases at least one, one or more, and and/or are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term automatic and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The Brayton cycle is a thermodynamic cycle that describes the workings of the gas turbine engine. It is named after George Brayton, the American engineer who developed it. It is also sometimes known as the Joule cycle. The ideal Brayton cycle consists of an isentropic compression process followed by an isobaric combustion process where fuel is burned, then an isentropic expansion process where the energized fluid gives up its energy to operate compressors or produce engine power and lastly an isobaric process where low grade heat is rejected to the atmosphere. An actual Brayton cycle consists of an adiabatic compression process followed by an isobaric combustion process where fuel is burned, then an adiabatic expansion process where the energized fluid gives up its energy to operate compressors or produce engine power and lastly an isobaric process where low grade heat is rejected to the atmosphere. A ceramic is an inorganic, nonmetallic solid prepared by the action of heating and cooling. Ceramic materials may have a crystalline or partly crystalline structure, or may be amorphous (e.g., a glass).

The cetane number is a measure of the ignition quality of a fuel and it is an indication of ease of self-ignition commonly in a Diesel combustion cycle. The higher the cetane number, the more easily the fuel is ignited under compression. It is a measure of a fuel's ignition delay; the time period between the start of injection and start of combustion (ignition) of the fuel. In a particular diesel engine, higher cetane fuels will have shorter ignition delay periods than lower cetane fuels. Cetane numbers are typically used for relatively light distillate diesel fuels. The cetane number was originally a minimum of 45-49 in 1993, was raised to 51 in 2000 to reduce ignition delay, improve combustion and reduce exhaust emissions. The introduction of electronically controlled injection allows a stepwise high-pressure injection of the fuel into the combustion chamber. This makes direct fuel injection sufficiently smooth and offers additional reductions of emissions so that the highly efficient direct-injection diesel engines are suitable for passenger cars, and they have since replaced the previously used swirl and pre-chamber engines. However, low emissions and smooth engine running can only be achieved with high-quality fuels and recent tests have shown that synthetic diesel fuels with ultra-high cetane numbers can reduce emissions further.

The term computer-readable medium refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The terms calculate compute and determine and variations thereof are used interchangeably and include any type of methodology, process, mathematical operation or technique.

CNG means Compressed Natural Gas.

A DGE or Diesel Gallon Equivalent is a measure of the volume of a fuel with an energy equivalent to the energy of 1 gallon of diesel fuel on a low heat value basis.

A driving strategy as used herein refers to vehicles capable of operating on two or more fuels and is a strategy for minimizing vehicle operating costs by assimilating knowledge on fuel costs, fuel consumption, fueling station locations, driving routes, driving terrain and driving restrictions (if any) and driving times and using this knowledge to pick a fueling location that minimizes overall vehicle operating costs and/or fuel consumption, respecting cost of various fuels, the driver's time and the types of routes to the various possible fueling stations.

The terms determine, calculate and compute and variations thereof are used interchangeably and include any type of methodology, process, mathematical operation or technique.

Energy density as used herein is energy per unit volume (Joules per cubic meter).

An engine is a prime mover and refers to any device that uses energy to develop mechanical power, such as motion in some other machine. Examples are diesel engines, gas turbine engines, microturbines, Stirling engines and spark ignition engines.

A free power turbine as used herein is a turbine which is driven by a gas flow and whose rotary power is the principal mechanical output power shaft. A free power turbine is not connected to a compressor in the gasifier section, although the free power turbine may be in the gasifier section of the gas turbine engine. A power turbine may also be connected to a compressor in the gasifier section in addition to providing rotary power to an output power shaft.

A gas turbine engine as used herein may also be referred to as a turbine engine or microturbine engine. A microturbine is commonly a sub category under the class of prime movers called gas turbines and is typically a gas turbine with an output power in the approximate range of about a few kilowatts to about 700 kilowatts. A turbine or gas turbine engine is commonly used to describe engines with output power in the range above about 700 kilowatts. As can be appreciated, a gas turbine engine can be a microturbine since the engines may be similar in architecture but differing in output power level. The power level at which a microturbine becomes a turbine engine is arbitrary and the distinction has no meaning as used herein.

A gaseous fuel is a fuel that is gaseous when at ambient conditions. Examples are natural gas, hydrogen, hydrogen enhanced natural gas and propane.

A gasifier is a turbine-driven compressor in a gas turbine engine dedicated to compressing air that, once heated, is expanded through a free power turbine to produce A GGE or Gasoline Gallon Equivalent is a measure of the volume of a fuel with an energy equivalent to the energy of 1 gallon of gasoline fuel on a low heat value basis.

A heat exchanger is a device that allows heat energy from a hotter fluid to be transferred to a cooler fluid without the hotter fluid and cooler fluid coming in contact. The two fluids are typically separated from each other by a solid material such as a metal that has a high thermal conductivity.

Hydrogen-enriched compressed natural gas ("HCNG") is a mixture of hydrogen and natural gas. The two can be mixed in any proportion, but typically, HCNG in the range of 10 percent to 20 percent hydrogen by volume can be used as an alternative to natural gas. At these concentrations, HCNG is generally compatible with existing natural gas transmission and distribution infrastructure, as well as end-use equipment. Moreover, codes and standards in many jurisdictions treat HCNG with less than 20 percent hydrogen as natural gas, which can enable HCNGs deployment into gas networks. HCNG may also be known by the acronym of HENG Hydrogen Enriched Natural Gas.

An ignition characteristic of a fuel refers to a chemical or physical property of the fuel that influences the condition under which the timing and intensity of burning occurs. In reciprocating engines, the timing of fuel ignition is typically desired in a narrow range of the combustion cycle, typically as the peak compression point is approached. Optimum ignition may be determined by performance or emissions requirements or both. For fuels used in reciprocating engines, there are many additives that may be used to modify ignition characteristics. In diesel engines, the cetane number relates to the fuels ease of self-ignition during compression. In spark-ignition engines, the octane rating is a measure of the resistance of the fuel to auto-ignition during compression.

An intercooler as used herein means a heat exchanger positioned between the output of a compressor of a gas turbine engine and the input to a higher pressure compressor of a gas turbine engine. Air, or in some configurations, an air-fuel mix is introduced into a gas turbine engine and its pressure is increased by passing through at least one compressor. The working fluid of the gas turbine then passes through the hot side of the intercooler and heat is removed typically by an ambient fluid such as, for example, air or water flowing through the cold side of the intercooler.

LHV means Low Heat Value and is the specific energy content (sometimes called the heat of combustion) of a fuel obtained from combusting the fuel wherein the water in the exhaust remains in the form of vapor. The High Heat Value (HHV) is based on the water in the exhaust being in liquid form. Since water vapor gives up heat energy when it changes from vapor to liquid, the HHV value is larger than the LHV of the fuel since it includes the latent heat of vaporization of water. The difference between the high and low values is significant and can be as much as about 10%.

LNG means Liquefied Natural Gas. Natural gas becomes a liquid when cooled to a temperature of about 111 K or lower. LNG is predominantly methane, typically 90% or more methane, that has been converted temporarily to liquid form for ease of storage or transport. LNG takes up about 1/600th the volume of natural gas in the gaseous state. In a typical LNG process, natural gas is transported to a processing plant where it is purified. The gas is then cooled down in stages until it is liquefied at close to atmospheric pressure (maximum transport pressure set at around 25 kPa) by cooling it to approximately 175 K (−162° C.). The reduction in volume makes it much more cost efficient to transport over long distances in specially designed cryogenic sea vessels (LNG carriers) or cryogenic road tankers. The energy density of LNG is 60% of that of diesel fuel on a low heat value (LHV) basis. The density of LNG is roughly 41 kg/cu m to 50 kg/cu m, depending on temperature, pressure and composition. The heat value depends on the source of gas that is used and the process that is used to liquefy the gas. The higher heating value of LNG is estimated to be 24 MJ/L at −164 degrees Celsius. This value corresponds to a lower heating value of 21 MJ/L.

The term means shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

A metallic material is a material containing a metal or a metallic compound. A metal refers commonly to alkali metals, alkaline-earth metals, radioactive and non-radioactive rare earth metals, transition metals, and other metals.

Natural gas is a naturally occurring hydrocarbon gas mixture consisting primarily of methane, with other hydrocarbons, carbon dioxide, nitrogen and hydrogen sulfide. Before natural gas can be used as a fuel, it must undergo processing to clean the gas and remove impurities including water to meet the specifications of marketable natural gas.

Octane rating is a measure of the resistance of gasoline and other fuels to auto-ignition in spark-ignition internal combustion engines. The octane number of a fuel is measured in a test engine, and is defined by comparison with the mixture of iso-octane and heptane which would have the same anti-knocking capacity as the fuel under test: the percentage, by volume, of iso-octane in that mixture is the octane number of the fuel. For example, petrol with the same knocking characteristics as a mixture of 90% iso-octane and 10% heptane would have an octane rating of 90. This does not mean that the petrol contains just iso-octane and heptane in these proportions, but that it has the same detonation resistance properties. Because some fuels are more knock-resistant than iso-octane, the definition has been extended to allow for octane numbers higher than 100. Octane rating does not relate to the energy content (heating value) of the fuel. It is only a measure of the fuel's tendency to burn in a controlled manner, rather than exploding in an uncontrolled manner. Where octane is raised by blending in ethanol, energy content per volume is reduced.

A prime power source refers to any device that uses energy to develop mechanical or electrical power, such as motion in some other machine. Examples are diesel engines, gas turbine engines, microturbines, Stirling engines, spark ignition engines and fuel cells.

Power density as used herein is power per unit volume (watts per cubic meter).

A recuperator is a heat exchanger dedicated to returning exhaust heat energy from a process back into the process to increase process efficiency. In a gas turbine thermodynamic cycle, heat energy is transferred from the turbine discharge to the combustor inlet gas stream, thereby reducing heating required by fuel to achieve a requisite firing temperature.

A regenerator is a type of heat exchanger where the flow through the heat exchanger is cyclical and periodically changes direction. It is similar to a countercurrent heat exchanger. However, a regenerator mixes a portion of the two fluid flows while a countercurrent exchanger maintains them separated. The exhaust gas trapped in the regenerator is mixed with the trapped air later. It is the trapped gases that get mixed, not the flowing gases, unless there are leaks past the valves.

Regenerative braking is the same as dynamic braking except the electrical energy generated is captured in an energy storage system for future use.

Shorepower is a term used in the trucking business utilizing a combination of truck-board and facility power systems. This is sometimes referred to as shorepower since the hardware aboard the sleeper cab and at the parking facility is similar to that found at boat marinas.

Specific power as used herein is power per unit mass (watts per kilogram).

Spool refers to a group of turbo-machinery components on a common shaft.

Spool speed as used herein means spool shaft rotational speed which is typically expressed in revolutions per minute ("rpms"). As used herein, spool rpms and spool speed may be used interchangeably.

Thermal efficiency as used herein is shaft output power (J/s) of an engine divided by flow rate of fuel energy (J/s), wherein the fuel energy is based on the low heat value of the fuel.

A thermal energy storage module is a device that includes either a metallic heat storage element or a ceramic heat storage element with embedded electrically conductive wires. A thermal energy storage module is similar to a heat storage block but is typically smaller in size and energy storage capacity.

A thermal oxidizer is a type of combustor comprised of a matrix material which is typically a ceramic and a large number of channels which are typically circular in cross section. When a fuel-air mixture is passed through the thermal oxidizer, it begins to react as it flows along the channels until it is fully reacted when it exits the thermal oxidizer. A thermal oxidizer is characterized by a smooth combustion process as the flow down the channels is effectively one-dimensional fully developed flow with a marked absence of hot spots.

A thermal reactor, as used herein, is another name for a thermal oxidizer.

A turbine is a rotary machine in which mechanical work is continuously extracted from a moving fluid by expanding the fluid from a higher pressure to a lower pressure. The simplest turbines have one moving part, a rotor assembly, which is a shaft or drum with blades attached. Moving fluid acts on the blades, or the blades react to the flow, so that they move and impart rotational energy to the rotor.

Turbine Inlet Temperature (TIT) as used herein refers to the gas temperature at the outlet of the combustor which is closely connected to the inlet of the high pressure turbine and these are generally taken to be the same temperature.

Turbocharger-like architecture or turbocharger technology means spools which are derived from modified stock turbocharger hardware components. In an engine where a centrifugal turbine with a ceramic rotor is used, the tip speed of the rotor is held to a proven allowable low limit (<500 m/s). Centrifugal compressors and turbines are sometimes called radial compressors and turbines.

A turbo-compressor spool assembly as used herein refers to an assembly typically comprised of an outer case, a radial compressor, a radial turbine wherein the radial compressor and radial turbine are attached to a common shaft. The assembly also includes inlet ducting for the compressor, a compressor rotor, a diffuser for the compressor outlet, a volute for incoming flow to the turbine, a turbine rotor and an outlet diffuser for the turbine. The shaft connecting the compressor and turbine includes a bearing system.

A volute is a scroll transition duct which looks like a tuba or a snail shell. Volutes may be used to channel flow gases from one component of a gas turbine to the next. Gases flow through the helical body of the scroll and are redirected into the next component. A key advantage of the scroll is that the device inherently provides a constant flow angle at the inlet and outlet. To date, this type of transition duct has only been successfully used on small engines or turbochargers where the geometrical fabrication issues are less involved.

BRIEF DESCRIPTION OF THE DRAWINGS

The present disclosure may take form in various components and arrangements of components, and in various steps and arrangements of steps. The drawings are only for purposes of illustrating the preferred embodiments and are not to be construed as limiting the disclosure. In the drawings, like reference numerals refer to like or analogous components throughout the several views.

DETAILED DESCRIPTION

Electrification Stations

Figure 1:
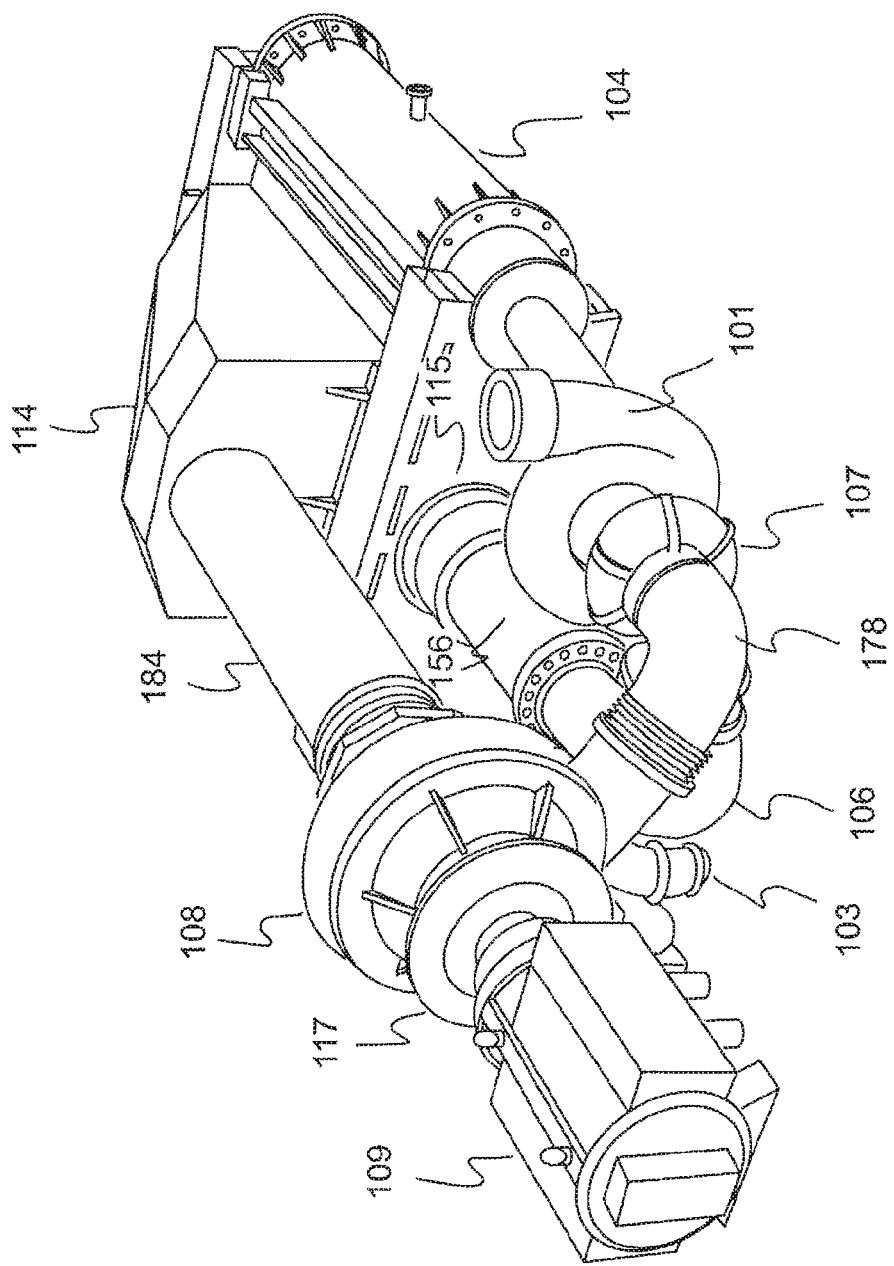
FIG. 1 is a line drawing of a previously disclosed gas turbine engine suitable for long haul trucks.

Truck engine idling is increasingly recognized as an aesthetic and environmental problem across the United States. Truck Stop Electrification (TSE) is an approach currently being deployed to reduce heavy truck idling at truck stops and rest areas. Drivers of the nearly 500,000 long-haul trucks in the United States must rest for specific periods as prescribed by U.S. Department of Transportation regulations. Long-haul truck drivers typically idle their engines to heat or cool sleeper cab compartments and to maintain vehicle battery. In colder climates, idling also keeps engine oil and fuel warm enough to prevent engine starting and operating problems. The average sleeper cab tractor idles for 1,830 hours annually, and consumes approximately one gallon of diesel fuel per hour. However, idling increases fuel and maintenance costs, emissions, and noise. TSE is a preferred approach to anti-idling because of zero on-site air emissions and minimal noise emissions. Heavy truck engine idling can be virtually eliminated at TSE-equipped locations and thus can improve environmental conditions at truck parking areas and in the communities that surround them.

An electrified fueling station is prior art. A typical stationary shorepower infrastructure consists of 20 or more RV-style power pedestals. Typically, one pedestal will be provided for each of the 20 or more parking spaces. A payment system or payment kiosk can be placed in each TSE parking space or can be placed centrally to the about 20 or more shorepower parking berths. Truck stop electrification facilities are examples of truck stop facilities that provide long-standing services such as fueling, restrooms and restaurants while overcoming significant emissions, noise and aesthetic concerns without unnecessary inconvenience to vehicle operators.

Liquid Natural Gas ("LNG") Fueling Stations

Liquid Natural Gas ("LNG") fueling stations are prior art. LNG fueling stations are currently used for fueling heavy and medium duty vehicles. The LNG fuel is produced at LNG plants from pipeline gas cooled to about −260 F (about 110 K) and delivered in LNG trailers to fuel stations. These plants can produce typically about 160,000 to about 300,000 gallon per day and typically can store about 1.5 to about 2 million gallons of LNG on site.

There are currently two Grades of LNG. The first is Blue (Cold) LNG for Westport GX engines and the second is Green (Warm) LNG for spark-ignited engines. Blue LNG increases storage capacity and range and is optimized for Westport GX engines. Its advantages are increased truck range, increased fuel economy and elimination of venting losses. It is a colder fuel, stored in on-board tanks at about −225 F and about 35 psig. Green LNG is optimized for CWI ISL-G spark-ignited engines. It is stored in on-board tanks at about −195 to about −207 F and about 85 to about 120 psig.

LNG fueling pumps are prior art. These fueling pumps can dispense fuel at rates comparable to diesel or gasoline pumps. Fueling may be carried out by the vehicle operator. A typical LNG truck stop will accommodate about 25 to about 50 trucks per hour with about 10 dispensing lanes and with about 100,000 gallons of fuel storage on site.

Compressed Natural Gas ("CNG") Fueling Stations

Compressed Natural Gas ("CNG") fueling stations are prior art. CNG fueling stations are currently used for fueling light, medium, and medium-heavy duty vehicles. Natural gas is delivered by pipeline to fueling station via the same distribution network used for gas that heats homes and used for cooking. The natural gas is compressed at the station to about 3,600 psi for dispensing and may be dispensed in a manner similar to gasoline or diesel fuel. When dispensed in this manner, it is known as fast fueling. It is typically stored on the vehicle in one or more gas cylinders.

CNG stations typically dispense about 35 million Diesel Gallon Equivalent ("DGEs") of CNG annually, growing at about 10% per year. Compressed natural gas is the same fuel that is used in many homes and is delivered in a pipeline by the local utility. CNG is used at about 3,600 psi as a gaseous fuel and is thus different from LNG, which is cryogenic. It is sold in therms, Gasoline Gallon Equivalents ("GGEs") or Diesel Gallon Equivalents (DGEs). On-board storage capacity is enough to provide sufficient range for regional trucking. CNG meets clean truck program requirements, it is typically a low fuel price requiring on-site fuel storage. CNG is odorized for safety and there is no wastage due to boil off.

There may be public and private fueling stations. A small private station may serve about a 50 truck fleet and dispense about 60,000 DGEs per month. A large private station may serve about a 200 truck fleet and dispense about 250,000 DGEs per month.

Typical commercial CNG dispensers are operated like a gasoline or diesel filling pump apparatus. This dispensing unit may be operated as a fast fueling pump where the vehicle operator may do the dispensing or it may be operated as a slow fueling pump where the vehicle operator can leave the vehicle to use a nearby rest stop, restaurant and store. As will be discussed below, the slow fueling method for CNG has a significant energy advantage over the fast fueling method for CNG and therefore the slow fueling method has a significant cost advantage as well. A typical commercial filling point that would be operated as a slow fueling pump where the vehicle operator can leave the vehicle parked for a substantial period (many minutes to a couple of hours).

One advantage of CNG as a fuel is that there already exists a natural gas distribution system in most countries. For example, a natural gas distribution network comprised of main natural gas distribution trunk lines and the smaller distribution pipelines exists in the United States and this network extends into Canada and Mexico. Currently, an LNG fuel station costs approximately 4 times more to install than a CNG fuel station.

Hydrogen-Enhanced Compressed Natural Gas ("HCNG")

Hydrogen-enriched natural gas, or HCNG, is a mixture of hydrogen and natural gas. The two can be mixed in any proportion, but typically, HCNG in the range of 10 percent to 20 percent hydrogen is a viable near-term option. At these concentrations, HCNG is generally compatible with existing natural gas transmission and distribution infrastructure, as well as end-use equipment. Moreover, codes and standards in many jurisdictions treat HCNG with less than 20 percent hydrogen as natural gas, which will enable its deployment into gas pipeline networks. Also, at these levels HCNG offers important emissions and potential efficiency benefits, compared with natural gas without significant hydrogen content.

HCNG enables the initial deployment of hydrogen into the energy system without the need for expensive infrastructure investments as it does not require dedicated storage, transmission and other equipment needed to use it directly as a fuel. The use of HCNG enhances combustion and reduces CO2 emission from natural gas. It also can result in lower emissions of pollutants such as nitrogen oxide (NOx), carbon monoxide (CO) and unburned methane and other hydrocarbons. HCNG can also improve the fuel efficiency of gas-fired combustion in engines and gas turbine engines, using existing natural gas delivery infrastructure and end-use equipment. HCNG decreases the carbon intensity associated even with natural gas and increases the efficiency of natural gas conversion into useful energy. Adding even small amounts of hydrogen leads to more complete combustion of the fuel, including CO, methane and other hydrocarbons in the gas stream. This can improve engine efficiency and lower emissions of harmful pollutants. HCNG helps avoid the formation of thermal NOx, because it allows stable combustion at leaner gas mixtures to achieve lower flame temperatures than is possible with conventional natural gas.

Fuel Spillage Catchment Systems

Liquid Fuel Catchment

Underground storage tank and storm water management requirements apply to fixed-base fueling as opposed to mobile fueling. Both mobile fueling and fixed base fueling practices must comply with the provisions of water pollution control, ground water quality standards, and surface water quality standards. For those facilities required to obtain permit coverage, any on-site fueling practices must comply with applicable regulations. At facilities not required to be covered under the permit, fueling activities are required to meet water quality standards.

All fuel tanks at fueling stations must be equipped with large basins around each fill pipe. These basins catch any fuel that spills on the ground during delivery. Another specification is the use of double-walled fuel tanks. The space between the inner and outer walls is filled with salt water. If a level sensor detects an increase in the brine level, an alarm alerts the operator of a leak.

Containment of drainage from the operating areas of a facility to prevent oil spills and contaminated runoff from reaching storm drains, streams (perennial or intermittent), ditches, rivers, bays, and other navigable waters. Facilities most often use poured concrete walls or earthen berms to contain drainage and provide secondary containment for storage tanks and curbing and ground catchment basins for fuel delivery truck loading/unloading areas. These contained areas are considered diked areas Secondary containment and diversionary structures are typically in place to contain oil-contaminated drainage (e.g., rainwater) or leaks around fuel dispensers, pipelines, valves, joints, transfer connections and tanks. For these purposes, facilities commonly use dikes, berms, curbing, culverts, gutters, trenches, absorbent material, retention ponds, weirs, booms, and other barriers or equivalent preventive systems.

Substantially equivalent containment systems may be possible for small double-walled systems equipped with spill prevention devices that generally have capacities of less than 12,000 gallons. Alternative containment systems may not be appropriate for tank systems larger than 12,000 gallons or for systems that consist of several tanks connected by manifolds or other piping arrangements that would permit a volume of oil greater than the capacity of one tank to be spilled as a result of a single system failure.

Facilities most often use poured concrete walls or earthen berms to contain drainage and provide secondary containment for storage tanks and curbing and catchment basins for fuel delivery truck loading/unloading areas. These contained areas are considered diked areas. Vehicle service facilities may employ many different types and designs of drainage control systems and oil-water separators. Facilities must implement a system that is consistent with good engineering practices, based on the size and complexity of their operations. Other facilities may use a completely or partially buried oil-water separator system equipped with an inlet valve and a weir and baffle system, which directs the oil to one compartment and the water to another. The oil-water separator must never automatically discharge treated water to a sanitary sewer or anywhere outside a contained area.

Other operating areas of a vehicle service facility that do not have secondary containment systems specifically designed for those areas (otherwise referred to as "localized containment") are considered undiked areas. Drainage must be controlled for these areas: truck-to-tank filling sites (unloading), truck or engine washdown areas, piping and manifold areas, garage bays, and fuel islands. All undiked areas can be designed to control drainage through a combination of curbing, trenches, catchment basins, and retention ponds, as necessary to retain a spill. These structures must be inspected and examined for integrity and their effectiveness. For example, if a paved area is improperly graded or if a curb is deteriorating, contaminated water may escape from the facility. For this reason, a Professional Engineer must certify the SPCC Plan to ensure that the drainage system is adequately designed and properly maintained in accordance with good engineering practices.

Whatever techniques are used, the facility's drainage systems should be adequately engineered to prevent oil from reaching navigable waters in the event of equipment failure or human error at the facility.

Gaseous Fuel Catchment

Gases such as hydrogen, natural gas and mixtures of natural gas and hydrogen are lighter than air and thus any spillage will rise and not contaminate the ground. Thus no ground catchment system is required and the fueling station need not have a concrete or asphalt surface with appropriate drainage where such gaseous fuels are dispensed.

Hydrogen, natural gas and mixtures of natural gas and hydrogen may have a catchment system associated with the filling attachment device that catches and returns any leaking gas to the gas storage system. A roof or hood over the individual or entire gaseous fueling area may be used for protection against weather and to trap and recover a portion of any gas spillage or leakage. Alternately, although less preferred, the hood over the individual or entire gaseous fueling area may be vented to allow a gas leakage to disperse into the atmosphere.

Gaseous fuels that are heavier than air such as, for example, propane may not require a ground catchment system if the area is well-ventilated and any spilled propane is able to disperse into the atmosphere.

Introduction of a New Fuel into an Operating Transportation System

The following is an example of how a new fuel can be integrated into an operating transportation system in a continuous, seamless manner. This example shows how diesel fuel can be gradually be replaced by compressed natural gas ("CNG") as a fuel for long haul trucks. As can be appreciated, this same approach can be used for other fuels as they are developed, characterized, mass produced and eventually distributed. The approach described herein overcomes the economic and investment risks associated with developing a new fuel when there is little or no distribution infrastructure in place for the new fuel.

Example of Replacing Diesel Fuel with CNG Fuel

Natural gas fuel has been recognized as a practical replacement for diesel fuel in terms of availability, cost and reduction of greenhouse gas emissions. It appears that all other alternatives for transportation fuels have as-yet-unresolved social, economic and commercial consequences. These consequences include their impact on world food prices, uncompetitive costs, extensive land usage and often limited availability. Natural gas can be used as a fuel either as compressed natural gas ("CNG") or liquefied natural gas ("LNG").

As a replacement for diesel fuel in over-the-road Class 8 trucks, LNG has been thought to be the most commercially viable form of natural gas because of its relatively high energy density compared to CNG and is believed to be necessary to enable efficient transportation over long distances. But the cost of LNG as a fuel is typically substantially the same as the cost of diesel fuel. This impacts the commercial risk for a trucking operator especially when an expensive truck is dedicated to operate only on LNG. To mitigate this disincentive, various levels of governments world-wide have instituted programs with economic inducements (subsidies) to encourage the adoption natural gas as a truck fuel.

The cost of LNG is generally higher than that of CNG because LNG requires significantly more energy to liquefy the natural gas to a cryogenic fluid than to compress CNG to its most practical storage pressure. Heretofore, natural gas has been much more abundant and available at a lower cost outside of North America. Thus, in the past, for natural gas to be practical as a widely used fuel, it would have to come from overseas, typically in the form of LNG because of the large distances over which it must be shipped. CNG however has become attractive, especially for North America, because of the recent application of horizontal drilling and hydraulic fracturing technologies to open up vast new sources of natural gas (often referred to as shale gas), which reduces the economic attractiveness of the more costly LNG from overseas.

An objective of this disclosure is to enable the adoption of natural gas as a transportation fuel for sound, sensible business reasons that will not require the same level of subsidy, if it needs to be subsidized at all. This method of introducing new fuels is expandable to other fuels such as bio-diesel, for example, once the large-scale production problems of such fuels are solved.

A primary reason that negatively impacts the business case for the adoption of LNG as a replacement for diesel fuel, especially in long-haul trucking, besides the obvious lack of fueling infrastructure, is the cost of LNG and the limitations and consequences of owning and operating an LNG truck.

When comparing the commodity feed stocks of LNG (natural gas) and diesel fuel (crude oil), the price comparison between the commodities on an energy basis is generally quite different, with natural gas being, on average, substantially below the cost of crude oil. However when comparing the delivered finished products LNG and diesel fuel, the costs are substantially comparable. This raises an important question for the owner-operator of the advantages of converting solely to LNG. Do the needs of special handling and servicing, and of higher cost of ownership justify the transition to LNG from a more widely used fuel such as diesel?

The reason for the significant difference between the commodity cost of natural gas and the delivered cost of LNG is the capital cost of all of the equipment, the regional liquefier plants, the on-highway delivery tanker truck fleet, and the on-site LNG fuel storage and dispensing, and additionally the high operating costs. The operating costs are the energy costs for the energy-intensive liquefaction process, the plant operating and maintenance costs, and the cost of operating the LNG distribution system. The high costs incurred in setting up an LNG production business are a barrier for smaller firms that could provide competition and thereby help lower LNG costs. LNG is required by natural gas-powered vehicles for range purposes. With the approach of the present disclosure, this need no longer be a constraint.

The other form of natural gas used as a vehicle fuel is CNG. CNG is significantly cheaper than LNG and has the potential to provide the necessary, non-subsidized economic justification to use CNG as a replacement for diesel fuel for over-the-road trucking. The reason that CNG has lower delivery cost is that in can be made available on-site, at a truck stop, with the existing natural gas distribution system. That is, CNG as a delivered fuel requires substantially lower capital and operating costs for its distribution infrastructure than LNG.

The primary argument against the use of CNG, especially for long distance trucking, is that it limits the operating range of a truck because CNG is a gaseous fuel with a relatively low energy density. Thus, the argument is that CNG tanks take up too much space and/or not enough fuel can be carried on-board and that LNG is preferable for extended range operations because of its higher energy density and therefore the ability to get more fuel on board the truck's limited space. Thus, LNG is often considered to be the most practical way to introduce natural gas as a substitute for diesel fuel.

U.S. patent application Ser. No. 13/090,104 entitled "Multi-Fuel Vehicle Strategy" offers a solution to the range limitation of CNG so that the truck operator is not adversely affected or inconvenienced. At the same time, the operator is able to reduce the operating costs of the truck without the need for subsidies.

One enabling technology for the adoption of CNG as a replacement of diesel fuel in over-the-road trucks is a practical gas turbine truck engine that can operate on different types of fuels and that can change fuels on the fly in a seamless fashion. Thus, fuel selection can become a discretionary decision based on cost and/or fuel consumption with less emphasis on fuel availability. Therefore, if a truck that is powered with a gas turbine engine and has a sufficiently large liquid fuel tank (for liquid fuels such as diesel fuel or gasoline for example) for an acceptable operating range, the CNG storage capacity (operational range on CNG) is not critical to the truck's economical operation. If the truck is not totally dependent on CNG for its operation, then it may be operated beyond the range of CNG fueling infrastructure and the sizing of the CNG storage can be determined based on practical and economic considerations other than range.

A CNG fueled truck that does not totally depend on CNG will be an incentive for the effort to adopt natural gas as a substitute for diesel fuel on the interstates highway system because it gets around the conundrum of (1) attracting customers for CNG before a CNG fueling infrastructure is available and (2) financing a CNG fueling infrastructure before a customer base is established.

As noted previously, an important aspect for the successful implementation of CNG as a truck fuel is the rational sizing of the CNG storage capacity based on with practical and economic considerations. CNG storage on a truck is relatively bulky and expensive compared to standard diesel fuel tanks on a diesel gallon equivalent (DGE) basis. CNG cylinders that can store natural gas at about 3,600 psi occupy about 4 times the volume of a diesel fuel tank having the same operating range. CNG cylinders that can store natural gas at about 4,200 psi occupy about 3.5 times the volume of a diesel fuel tank having the same operating range. While CNG tanks currently cost several times the cost of diesel fuel tanks and can add significant weight as well as volume to the fuel storage system, costs are expected to come down as usage increases.

What first becomes apparent is that the CNG fuel storage needs to fit on the truck's tractor or trailer chassis while retaining the standard, or at least, an acceptable amount of diesel fuel storage on board. Secondly, a reasonable amount of CNG storage needs to be considered because of cost and/or fuel consumption. Carrying any more CNG that is needed for the minimum amount of acceptable convenience, adversely affects the operating economics of the truck. Having too little CNG storage on board is also counterproductive as the driver will need to refill the CNG tanks more often than usual, resulting in the driver wasting time that will adversely affect schedule.

Sizing the CNG fuel tanks so that under normal driving conditions, refilling would coincide with the driver's need for breaks appears to be practical. Thus, if the driver goes about 4 hours between breaks (meals) and covers about 250 miles during that period and is getting about 6.5 miles per gallon, the operator will need at least 38 DGE of CNG on board to cover that distance with natural gas (250 miles/6.5 miles per gallon=38.5 gallons). Space for about 40 to 50 DGE of CNG storage appears to be available without compromising the operation and safety of the truck tractor or trailer.

By way of illustration, for the above case of an approximately 4 hour driving range on CNG, the volumetric ratio of CNG storage compared to liquid fuel storage volume is typically in the range of from about 0.3:1 to about 1:1, and even more typically in the range of from about 0.4:1 to about 0.8:1. Stated another way, the available fuel energy ratio of stored liquid fuel to stored CNG is typically in the range of from about 2.5:1 to about 10:1, and even more typically in the range of from about 4:1 to about 8:1.

By way of further illustration, for the above case of approximately equal driving ranges, the volumetric ratio of CNG storage compared to liquid fuel storage volume is typically in the range of from about 1:1 to about 6:1, and even more typically in the range of from about 3:1 to about 5:1.

Exemplary Gas Turbine Engine

A gas turbine engine is an enabling engine for efficient multi-fuel use and, in particular, this engine can be configured to switch between fuels while the engine is running and the vehicle is in motion (on the fly). In addition, a gas turbine engine can be configured to switch on the fly between liquid and gaseous fuels or operate on combinations of these fuels. This is possible because combustion in a gas turbine engine is continuous (as opposed to episodic such as in a reciprocating piston engine) and the important fuel parameter is the specific energy content of the fuel (that is, energy per unit mass) not its cetane number or octane rating. The cetane number (typically for diesel fuels) or octane rating (typically for gasoline fuels) are important metrics in piston engines for specifying fuel ignition properties.

The gas turbine engine such as shown in FIG. 1 enables the fuel strategy of the present disclosure. This engine type is known although efficient multi-fuel configurations will require innovative modifications. This is an example of a 375 kW engine that uses intercooling and recuperation to achieve high operating efficiencies (40% or more) over a substantial range of vehicle operating speeds. This compact engine is suitable for light to heavy trucks. Variations of this engine design are suitable for smaller vehicles as well as applications such as, for example, marine, rail, agricultural and power-generating. One of the principal features of this engine is its fuel flexibility and fuel tolerance. This engine can operate on any number of liquid fuels (gasoline, diesel, ethanol, methanol, butanol, alcohol, bio diesel and the like) and on any number of gaseous fuels (compressed or liquid natural gas, propane, hydrogen and the like). This engine may also be operated on a combination of fuels such as mixtures of gasoline and diesel or mixtures of diesel and natural gas. Switching between these fuels is generally a matter of switching fuel injection systems and/or fuel mixtures.

For example, at a first time a gas turbine engine burns a first fuel mixture, and at a second time, a different second fuel mixture. The first and second mixtures include at least one uncommon fuel type. The first mixture, for instance, can utilize diesel as the primary fuel, and the second mixture CNG or LNG as the primary fuel. In another illustration, the first mixture, by way of further illustration, is a first mixture ratio of fuels A and B, and the second mixture a different second mixture ratio of fuels A and B. In all of the above illustrations, the specific energy of the first fuel mixture is commonly at least about 20%, more commonly at least about 50%, and even more commonly at least about 80% of the specific energy of the second fuel mixture. For example, a reciprocating engine typically burns fuels having a low heat value (LHV) in the range of about 40 million to about 55 million Joules per kilogram. A gas turbine engine can burn fuels having a low heat value (LHV) in the more inclusive range of about 10 million to about 55 million Joules per kilogram.

Not only can a gas turbine burn fuels of lower specific energy, but it can burn less complex fuels as discussed below. This has the potential of reducing the costs of refining fuels by simplifying fuel requirements.

This engine operates on the Brayton cycle and, because combustion is continuous, the peak operating temperatures are substantially lower than comparable sized piston engines operating on either an Otto cycle or Diesel cycle. This lower peak operating temperature results in substantially less NOx emissions generated by the gas turbine engine shown in FIG. 1. This figure shows a load device 109, such as for example a high speed alternator, attached via a reducing gearbox 117 to the output shaft of a free power turbine 108. A cylindrical duct 184 delivers the exhaust from free power turbine 108 to a plenum 114 which channels exhaust through the hot side of recuperator 104. Low pressure compressor 101 receives its inlet air via a duct (not shown) and sends compressed inlet flow to an intercooler (also not shown). The flow from the intercooler is sent to high pressure compressor 103 which is partially visible underneath free power turbine 108. As described previously, the compressed flow from high pressure compressor 103 is sent to the cold side of recuperator 104 and then to a combustor which is contained inside recuperator 104. The flow from combustor 115 (whose outlet end is just visible) is delivered to high pressure turbine 106 via cylindrical duct 156. The flow from high pressure turbine 106 is directed through low pressure turbine 107. The expanded flow from low pressure turbine 107 is then delivered to free power turbine 108 via a cylindrical elbow 178.

This engine has a relatively flat efficiency curve over wide operating range. It also has a multi-fuel capability with the ability to change fuels on the fly as described in U.S. patent application Ser. No. 13/090,104 entitled "Multi-Fuel Vehicle Strategy" which is incorporated herein by reference.

For example, in a large Class 8 truck application, the ability to close couple turbo-machinery components can lead to the following benefits. Parts of the engine can be modular so components can be positioned throughout vehicle. The low aspect ratio and low frontal area of components such as the spools, intercooler and recuperator facilitates aerodynamic styling. The turbocharger-like components have the advantage of being familiar to mechanics who do maintenance. It can also be appreciated that the modularity of the components leads to easier maintenance by increased access and module replacement. Strategies for replacement based on simple measurements filtered by algorithms can be used to optimize maintenance strategies. These strategies could be driven by cost, fuel consumption, emissions or efficiency. In a Class 8 truck chassis, the components can all be fitted between the main structural rails of the chassis so that the gas turbine engine occupies less space than a diesel engine of comparable power rating. This reduced size and installation flexibility facilitate retrofit and maintenance. This ability also permits the inclusion of an integrated APU on either or both of the low and high pressure spools such as described in U.S. patent application Ser. No. 13/175,564 entitled "Improved Multi-Spool Intercooled Recuperated Gas Turbine" which is incorporated herein by reference. This ability also enables use of direct drive or hybrid drive transmission options.

Multi-Fuel Truck Configurations

The multi-fuel configurations discussed below have the advantage of extending the range of operation of the vehicle and provide an opportunity for optimizing vehicle economics by providing a convenient choice of using lower cost fuels when these are available or operating on readily available fuels when the preferred fuel is not readily available. Remote monitoring of the vehicle can be utilized to optimize vehicle economics by dispatch from a central logistics office. This method was disclosed in U.S. patent application Ser. No. 13/090,104 entitled "Multi-Fuel Vehicle Strategy"

Figure 2:
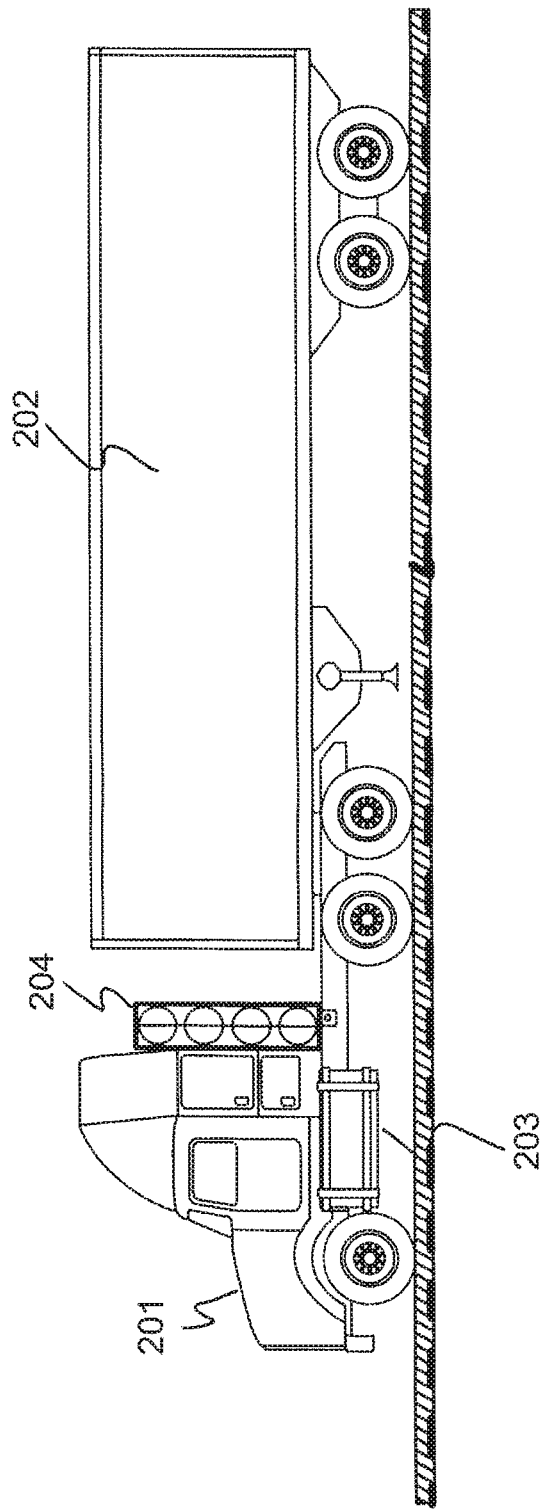
FIG. 2 is a schematic of a truck with a second fuel tank on the cab.

FIG. 2 is a schematic of a gas-turbine powered truck with a second fuel tank mounted behind the tractor cab. This figure shows a tractor 201 pulling a trailer 202. As an example, the tractor 201 is shown with diesel fuel tanks 203 mounted under the tractor cab. The diesel tanks can have a capacity in the range of about 150 to about 400 gallons of diesel fuel, with about 300 gallons of diesel fuel being typical. CNG tanks 204 are shown mounted behind the tractor cab. CNG tanks 204 are available commercially with capacity in the practical range of about 25 to about 150 DGEs with about 40 DGEs being required for about 250 miles of driving range. This truck configuration was disclosed in U.S. patent application Ser. No. 13/090,104 entitled "Multi-Fuel Vehicle Strategy".

Multi-Fuel Fueling Station

Example of Refueling Procedure to Accommodate New Fuel

Refueling a truck more than 1 or 2 times per day could take an hour out of the driver's day. This could be considered an inconvenience especially if the driver is used to an operating range that the typical 300 gallon diesel fuel tank yields between refueling. The present disclosure proposes a method for substantially minimizing this time-consuming inconvenience of periodic re-fillings of a limited capacity CNG fuel tank.

When the driver takes a break from driving, the driver often stops at a large truck stop. Here the driver can park his truck in a designated spot. If this spot is equipped with a CNG dispenser or a CNG filling post, the driver can connect his truck to a source of CNG in seconds, go about business, return, disconnect his re-fueled truck from the CNG dispenser, again in seconds, and drive off. This entire procedure would be virtually the same as his normal routine and he will have refueled the truck with CNG in the process. As can be appreciated, the recording and purchasing of the CNG can all be handled electronically.

The gas turbine engine has an advantage over other types of internal combustion engines, such as for example diesel engines, in that they can typically burn a variety of fuels without regard for ignition characteristics and with little or no modification to the fuel injection system. Gas turbines are substantially insensitive to the ignition characteristics of fuels and can operate on fuels having a wide range of specific energy values. This is principally because the combustion process in a gas turbine engine is substantially continuous. The combustion process in a reciprocating engine is cyclical and requires ignition of new fuel introduced during each cycle. Therefore, gas turbine engines are well-suited for multi-fuel operation. For example, a vehicle utilizing a gas turbine engine may be operated on either diesel fuel which is widely available for vehicles, or on CNG or LNG (the latter two being less widely available for vehicles) simply by selecting the fuel delivery system. For example, gas turbines can be fitted with injectors that permit both gaseous and liquid fuels to be used. The vehicle can be outfitted with a diesel fuel tank and a CNG or LNG fuel tank.

In one vehicle design, the vehicle has multiple on-board stored fuel receptacles, each receptacle including a different type of gaseous or liquid fuel. For example, a first fuel can be diesel fuel, and a second fuel can be CNG. In a further example, the first fuel can be a renewable or a nonrenewable fuel while the second fuel can also be a renewable or a nonrenewable fuel. The vehicle has a prime mover, such as a gas turbine engine, that is substantially independent of one or more of the fuel additives required by reciprocating engines. By way of illustration, such additives may include for example, anti-oxidants, metal de-activators, and anti-stall agents, and other antiknock chemicals for gasolines and cold-flow improvers, wax anti-settling additives, detergents, anti-corrosion, anti-wear additives and anti-foam additives for diesel fuels.

An innovative feature of this system is that the change from one fuel to another can be made on the fly, even if one fuel is a liquid (diesel in this example) and one is gaseous (CNG in this example). Unlike other dual fuel (diesel/natural gas) truck engine technology, a gas turbine engine can replace commonly at least about 75%, more commonly at least about 80%, more commonly at least about 85%, more commonly at least about 90%, more commonly at least about 95%, and even more commonly about 100% of the diesel fuel with natural gas. This is so because the piston dual fuel engine must retain a portion of its diesel fuel to serve as an ignition source for the natural gas.

If, for example, natural gas is the more desirable fuel from either or all of a cost standpoint, a fuel consumption standpoint or an emissions standpoint, then it would be preferable to operate the vehicle on natural gas as long as natural gas were readily available. If the vehicle could not be readily refueled with natural gas, it could be switched to operate on diesel, which is less desirable but almost universally available. It is also noted that a gas turbine engine can be configured to operate on a mixture of liquid and gaseous fuels and/or even on a mixture of liquid fuels such as, for example, a mixture of gasoline and diesel. With the present disclosure, it may also be possible to achieve a net reduction of emissions by selecting a ratio of natural gas to diesel, allowing the engine to be operated in a minimum emissions mode. The accelerated flame of the diesel fuel in a diesel/natural gas mix may have beneficial effects in the design of the gas turbine combustor.

Another aspect of the present disclosure is that refueling episodes for the less widely available fuels may be designed to resemble the refueling episodes for the more widely available fuels so that vehicle operators will choose a fuel based on cost, fuel consumption or emissions criteria or any combination of the three, and not on the convenience of the fuel dispensing system to which they are accustomed.

As an example of this, a vehicle can be parked and slow-filled with CNG while the operator uses the store/restaurant facility. In slow-fill, the CNG is pressurized from a lower pressure to the maximum pressure of the vehicle's CNG gas storage cylinders (typically about 3,600 psia or about 25 kPa). This method of filling uses a minimum of energy for gas compression and permits more fuel to be stored due to the more accurate reading of tank pressure and temperature during the fill, thus optimizing tank fill by measuring pressure and temperature and using this information to modulate the flow. This is in contrast to rapid filling (which is more convenient and mimics filling with diesel or gasoline, where the operator does the filling and then moves on) wherein the CNG is expanded from a higher pressure source down to the maximum pressure of the vehicle's CNG storage cylinders. This method of filling uses more energy for compression to the higher pressure storage tanks, typically about 20% to about 25% more energy, and this is reflected as an increased fuel price (typically about 10 to about 12 cents of every dollar).

The above discussion of integrating a new fuel into an existing transportation situation (such as the above example of introducing CNG to a long haul truck fleet) can be implemented with at least two enabling technologies. The first is an engine capable of operating seamlessly on multiple fuels. The second is a system of determining a fueling strategy that reduces overall operational costs (including fuel consumption) and makes the transition from one fuel to another seamless to the truck driver.

Figure 3:
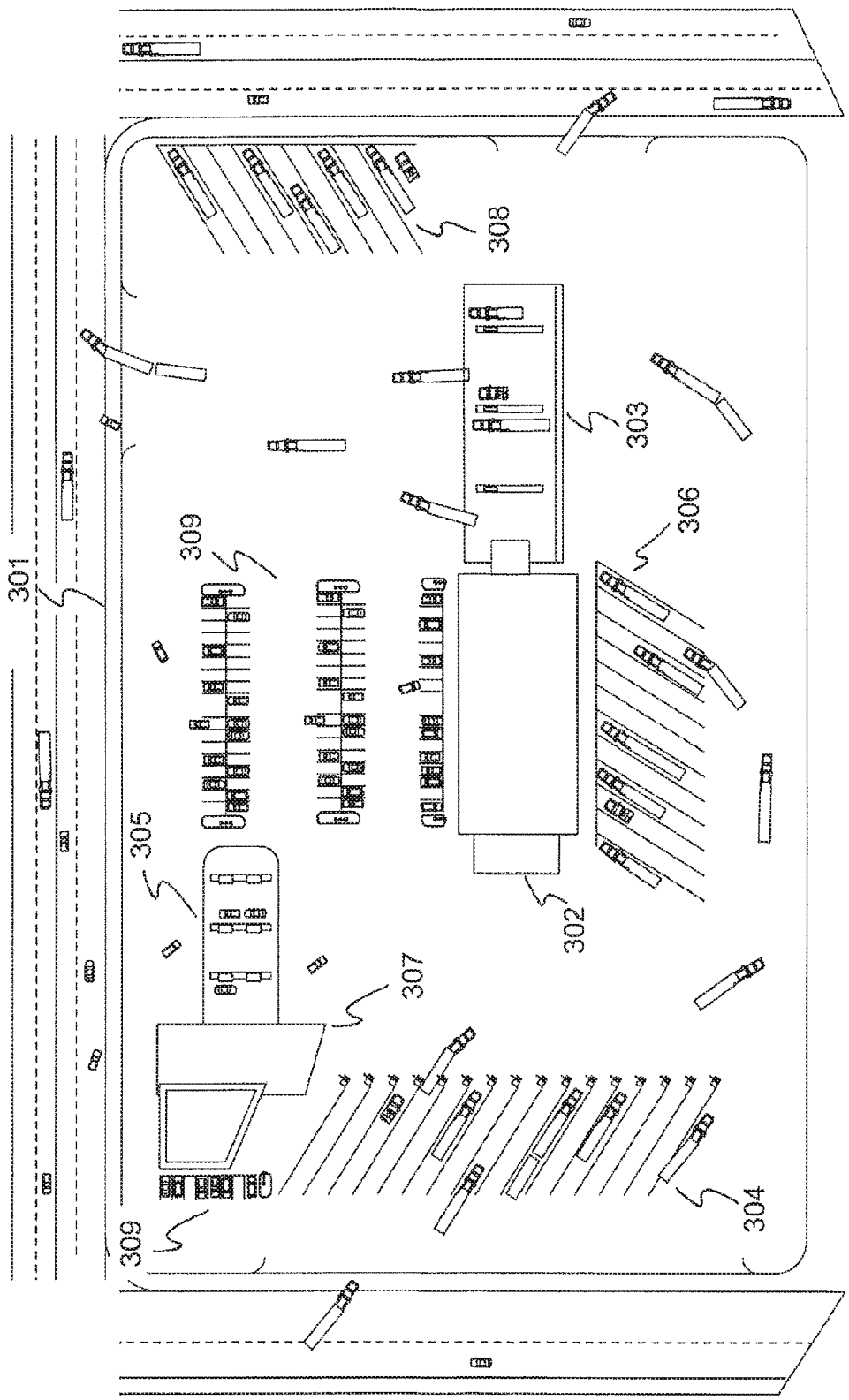
FIG. 3 is a schematic of an example multi-fuel fueling station.

FIG. 3 is a schematic of an example multi-fuel fueling station. This figure shows a typical fueling station accessed from a main thoroughfare 301, such as for example an interstate highway or a connector to an interstate highway. The fueling station is comprised of a parts store/restaurant 302, a convenience store 307, several auto parking areas 309, several truck diesel pump dispensing lanes 303, several auto gasoline and diesel pump dispensing lanes 305, a truck parking area 306, an overnight truck electrification (TSE) truck parking area 308 and a truck parking area with several CNG fuel fill posts 304. Additionally there can be separate CNG and LNG dispensing lanes similar to the truck diesel pump dispensing lanes 303, dispensing natural gas. As can be further appreciated, there can be other fuel pump dispensing other liquid fuel like methanol, bio-diesel, and ethanol but unlike CNG would require supervised filling on a ground catchment surface of a fueling lane and not in a unpaved parking area.

Figure 5:
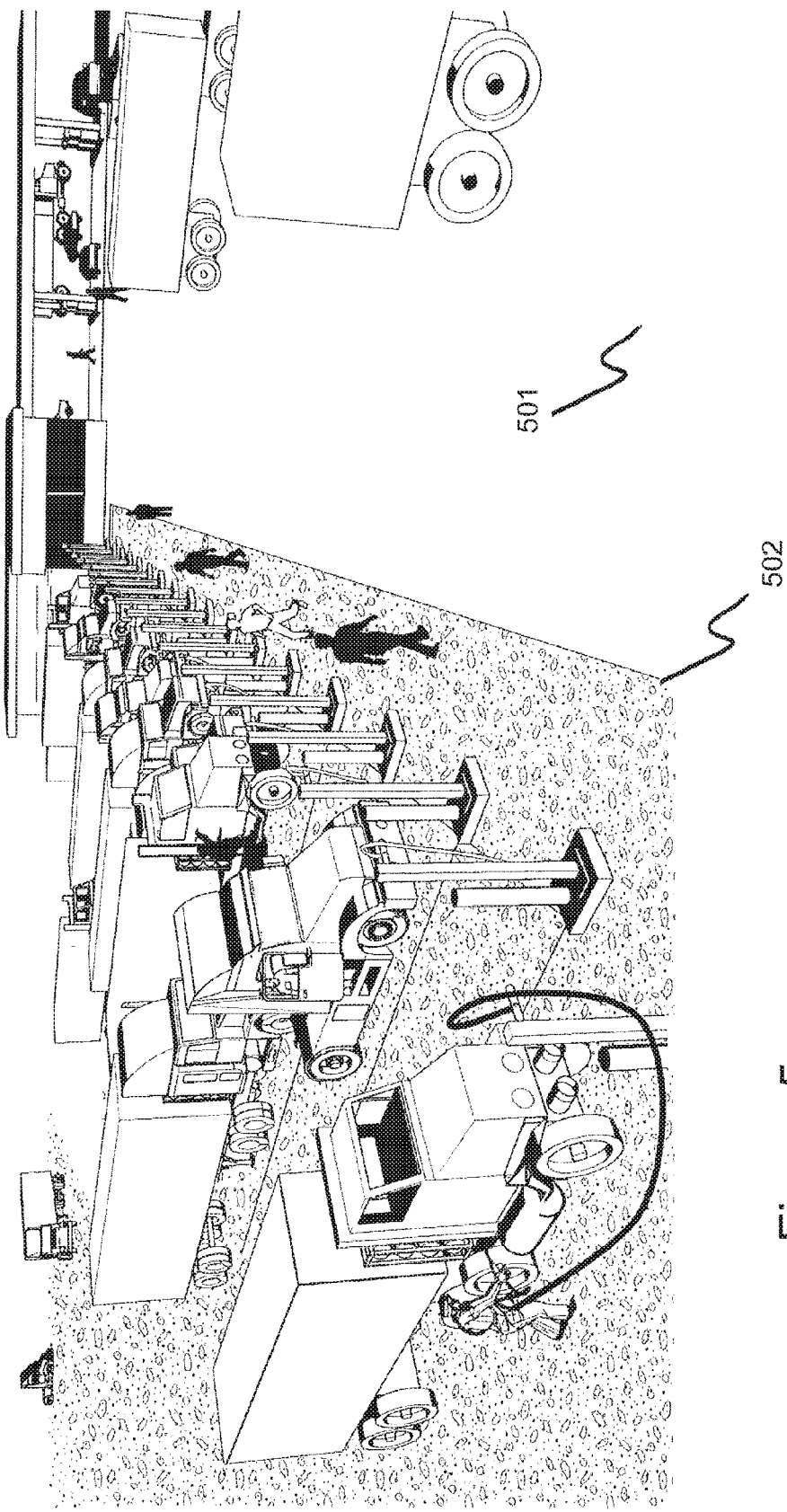
FIG. 5 is a schematic of an example CNG filling area at a truck stop.
Figure 6:
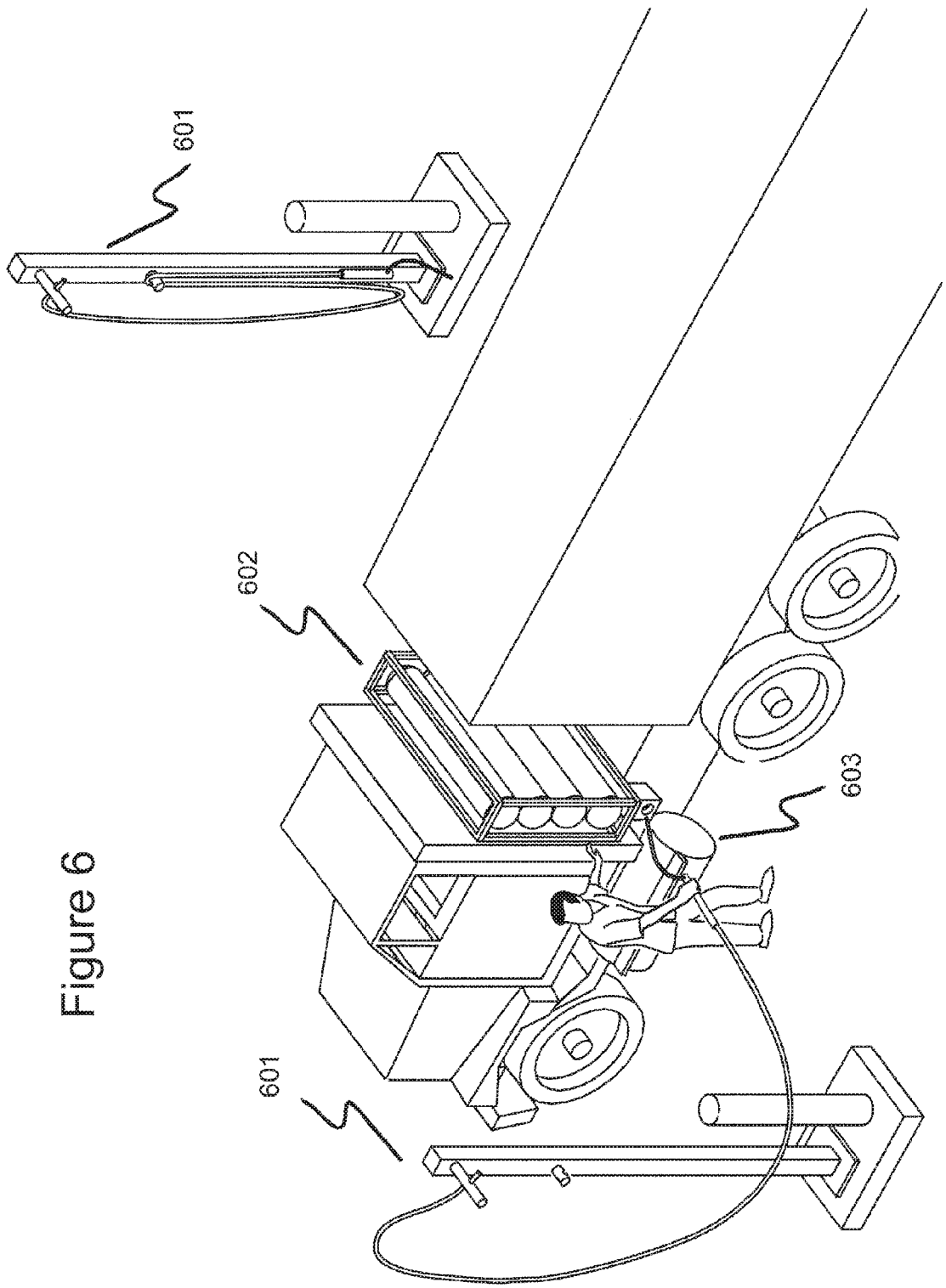
FIG. 6 is a schematic of a truck being fueled at a CNG truck stop.

In this example, a gas turbine powered truck with multi-fuel capability such as shown in FIGS. 2, 5 and 6 can be refueled with either or both diesel and CNG. Diesel fuel can be pumped by the vehicle operator or a station attendant in the normal manner. In the case of CNG, CNG can be pumped by the vehicle operator or a station attendant using a high speed fueling system or the vehicle can be refueled by the vehicle operator who, after initiating refueling, goes to the store/restaurant while CNG tank is being refueled by a slower fueling system. The design of the dual fuel or multi-fuel fueling station is such that the vehicle operators perform fueling operations in the manner to which they are accustomed.

For CNG or other gaseous fuels, a slow fueling system can be practical. With this method, the vehicle remains in a parking space which is equipped with a CNG or another gaseous fuel dispensing system. The parking space may also include a TSE capability. The vehicle operator would initiate fueling and then leave the vehicle while he/she uses the restaurant/store facilities. The slow fueling system is preferred because it uses less energy and therefore would result in a fuel cost savings. With this method, the gaseous fuel is compressed from a low pressure line or storage tank to the final pressure in the vehicles fuel tank (typically in the range of about 3,600 psi to about 4,500 psi). The slow fueling method also allows the heat generated by compression to dissipate through the fuel tank walls.

The refueling facility can transmit fuel availability, price, facility availability. Upon selection of a fueling strategy by the driver and/or the computer, an ID tag and fuel station pump location can be transmitted to the on board computer that optimizes driver experience and minimizes wait times. The facility can update fuel port allocations in real time to reduce any delays. The vehicle ID number can be associated with the transaction number for fuel pump activation and the ensuing financial transaction. The fuel pump can only permit fueling when the vehicle ID and transaction number match for a specific delivery port at the refueling station. For heavy use periods premium lanes with no wait may be available for an increased fuel cost.

The refueling transaction can be either on a credit basis, taken from a prepaid account, or accumulated for separate invoicing but be substantially automated without additional driver input. Payment for fueling can be accomplished by several means, including but not limited to cash, credit card, debit card, automated license scanning and subsequent e-mailed or mailed billing and the like. If an emissions or greenhouse credit is available, this credit can also be accounted by any number of well-known means.

The energy to compress a kilogram of natural gas to about 3,600 psi with a slow fueling system is approximately 1.3 MJ. The energy to compress a kilogram of natural gas to about 3,600 psi with a fast fueling system is about 1.6 MJ or about 23% more energy than with a slow fueling system.

This multi-fuel fueling station was disclosed in U.S. patent application Ser. No. 13/090,104 entitled "Multi-Fuel Vehicle Strategy"

Figure 4:
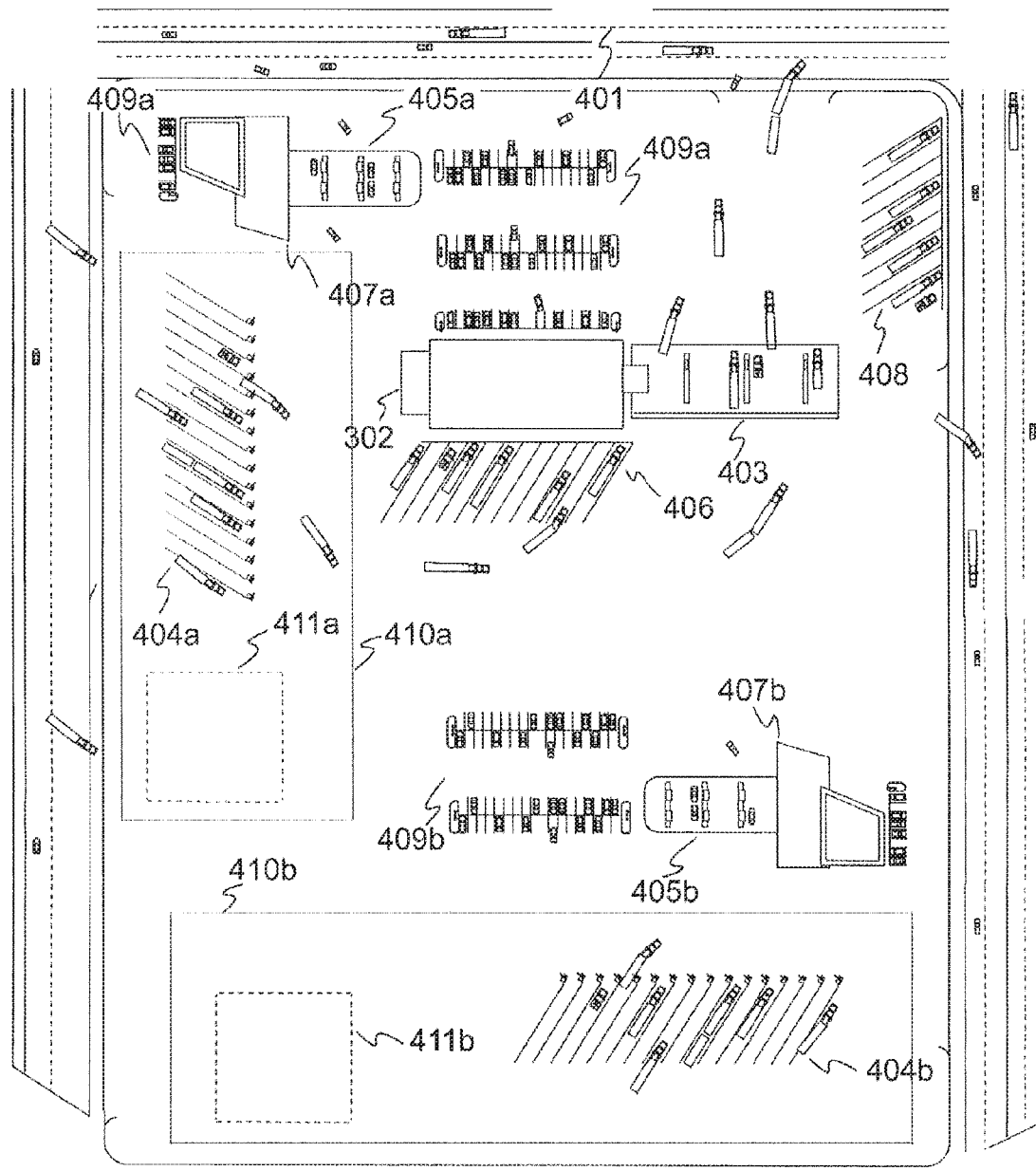
FIG. 4 is a schematic of an alternate example multi-fuel fueling station.

FIG. 4 is a schematic of an alternate example multi-fuel fueling station. This figure shows an expanded fueling station accessed from a main thoroughfare 401, such as for example an interstate highway or a connector to an interstate highway. The fueling station is comprised of a parts store/restaurant 402, one or more convenience stores 407a, 407b, several auto parking areas 409a, 409b, several truck diesel pump dispensing lanes 403, several auto gasoline and diesel pump dispensing lanes 405a, 405b, a truck parking area 406, an overnight truck electrification (TSE) truck parking area 408 and one or more truck parking areas with several CNG fuel fill posts 404a, 404b. Additionally there can be separate CNG and LNG dispensing lanes similar to the truck diesel pump dispensing lanes 403, dispensing natural gas. As can be further appreciated, there can be other fuel pump dispensing other liquid fuel like methanol, bio-diesel, and ethanol but unlike CNG would require supervised filling on a ground catchment surface of a fueling lane and not in a unpaved parking area.

In this example, truck parking CNG fueling areas with several CNG fuel fill posts 404a, 404b, are shown in shading which represents unpaved ground 410a, 410b, which may be gravel, dirt or the like. Underground CNG storage tanks and dispensing systems (such as described in FIG. 7) are indicated by dotted areas 411a, 411b.

In this example, a gas turbine powered truck with multi-fuel capability such as shown in FIGS. 2, 5 and 6 can be refueled with either or both diesel and CNG. Diesel fuel can be pumped by the vehicle operator or a station attendant in the normal manner. In the case of CNG, CNG can be pumped by the vehicle operator or a station attendant using a high speed fueling system or the vehicle can be refueled by the vehicle operator who, after initiating refueling, goes to the store/restaurant while CNG tank is being refueled by a slower fueling system. The design of the dual fuel or multi-fuel fueling station is such that the vehicle operators perform fueling operations in the manner to which they are accustomed.

For CNG or other gaseous fuels, a slow fueling system can be practical. With this method, the vehicle remains in a parking space which is equipped with a CNG or another gaseous fuel dispensing system. The parking space may also include a TSE capability. The vehicle operator would initiate fueling and then leave the vehicle while he/she uses the restaurant/store facilities. The slow fueling system is preferred because it uses less energy and therefore would result in a fuel cost savings. With this method, the gaseous fuel is compressed from a low pressure line or storage tank to the final pressure in the vehicles fuel tank (typically in the range of about 3,600 psi to about 4,500 psi). The slow fueling method also allows the heat generated by compression to dissipate through the fuel tank walls.

The refueling facility can transmit fuel availability, price, and facility availability. Upon selection of a fueling strategy by the driver and/or the computer, an ID tag and fuel station pump location can be transmitted to the on board computer that optimizes driver experience and minimizes wait times. The facility can update fuel port allocations in real time to reduce any delays. The vehicle ID number can be associated with the transaction number for fuel pump activation and the ensuing financial transaction. The fuel pump can only permit fueling when the vehicle ID and transaction number match for a specific delivery port at the refueling station. For heavy use periods premium lanes with no wait may be available for an increased fuel cost.

The refueling transaction can be either on a credit basis, taken from a prepaid account, or accumulated for separate invoicing but be substantially automated without additional driver input. Payment for fueling can be accomplished by several means, including but not limited to cash, credit card, debit card, automated license scanning and subsequent e-mailed or mailed billing and the like. If an emissions or greenhouse credit is available, this credit can also be accounted by any number of well-known means. Such a fuel search and billing system is described in U.S. patent application Ser. No. 13/090,104 entitled "Multi-Fuel Vehicle Strategy" which has been previously referenced.

The energy to compress a kilogram of natural gas to about 3,600 psi with a slow fueling system is approximately 1.3 MJ. The energy to compress a kilogram of natural gas to about 3,600 psi with a fast fueling system is about 1.6 MJ or about 23% more energy than with a slow fueling system.

FIG. 5 is a schematic of an example CNG filling area at a truck stop. This figure illustrates an open-air CNG filling area 502 showing CNG filling posts mounted on concrete pads. The trucks at the filling posts are shown parked on a gravel surface since CNG fuel spills are lighter than air and will rise and disperse. The parking and fueling areas for the remainder of the truck stop 501 is shown as having an asphalt or concrete surface. As can be appreciated, the CNG filling area may also have an asphalt or concrete surface though it is not needed to provide a ground catchment system for fuel spills.

FIG. 6 is a schematic of a truck being fueled at a CNG truck stop. This figure shows a truck with diesel fuel tanks 603 and CNG fuel tanks 602. The CNG fuel tanks 602 are shown being filled by a fuel line attached to one of the CNG fueling posts 601. The fueling post may be connected to a fueling system for either rapid filling or slow filling as determined by its location or selected by an operator who is fueling the truck. A rapid fill is approximately the same as an average time to pump liquid fuel into the vehicle. A slow fill is longer than an average time to pump liquid fuel into the vehicle.

Figure 7:
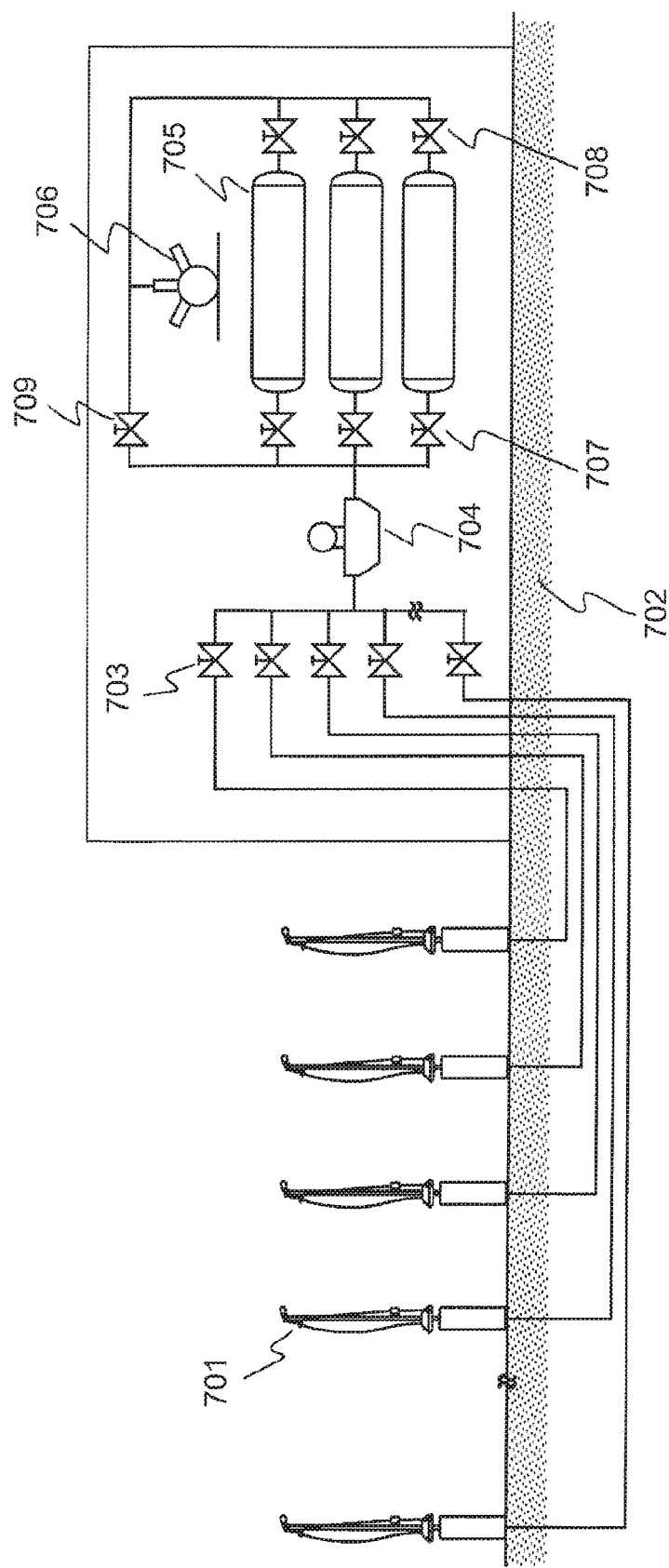
FIG. 7 is a schematic of a CNG fuel dispensing system.

FIG. 7 is a schematic of a CNG fuel dispensing system such as may be included in the truck stop of FIGS. 3, 4 and 5. This figure shows several fuel filling posts 701 at which large trucks can re-fuel their CNG tanks. Slow fill fueling a 20 to 50 DGE CNG tank is expected to take from about 15 to about 30 minutes, depending on how much fuel is required by each truck and how many trucks are being fueled at the same time. CNG is typically stored in three CNG storage tanks 705 in a cascaded storage arrangement. CNG is dispensed to multiple filling posts 710 using a single flow meter 704. Valves 703 control metered amounts of CNG to the various filling posts. Valves 707 control which storage tank 705 provides the CNG. The storage tanks are typically maintained at differing pressures so that initial filling is done at the lowest pressure and final topping off is done at the highest pressure. This cascaded fill approach minimizes energy required to fill a vehicle CNG fuel tank. Compressor 706 controls the pressure in tanks 705 via sequencing valves 708 when master valve 709 is open. All valves and flow meter 704 are electronically controlled so that the amount of CNG dispensed at each filling post is precisely known. This configuration eliminates the need for a separate expensive flow meter at each filling post 701. Flow meter 704 can dispense CNG at a rate in the range of about 5 DGE per minute to about 100 DGE per minute, depending on the number of CNG filling posts 701. It is noted that the CNG fueling area may be paved or unpaved as there is no ground spillage from a CNG fuel dispensing facility. As can be appreciated, this dispensing system can be used for any fuel whether it is gaseous or liquid. An innovation is the use of a single flow meter to dispense fuel to multiple fueling stations. All the valves, the single flow meter and storage tanks can be contained in a single nearby or remote location with an underground natural gas line routed to the area of the various gas filling posts.

Placement of Liquid and Gaseous Fuel Dispensers

Liquid fueling pumps, where liquid fuels such as gasoline, diesel fuel, bio-diesel, ethanol, methanol, butanol and the like are dispensed, can be located in a liquid fueling area where a ground catchment system is in place. The area can be partially or wholly covered for protection from the weather. Liquid fueling pumps are generally set up for rapid fueling. A rapid fill is taken herein to require approximately the same as an average time to pump a typical liquid fuel, such as gasoline, into the vehicle.

Gaseous fueling pumps, where fuels are gaseous at ambient conditions include fuels such as compressed natural gas, hydrogen, hydrogen-enhanced compressed natural gas and propane and the like are dispensed, can be located in a gaseous fueling area where a ground catchment system is not required. The area can be partially or wholly covered for protection from the weather and can include an overhead catchment system such as a roof or hood. Gaseous fueling pumps can be set up for a slow fill only where a slow fill time is considerably longer than an average time to pump a liquid fuel such as gasoline into the vehicle. Alternately, gaseous fueling pumps can be set up for a slow fill or rapid fill as selected by the fueling station operator or vehicle driver.

It is also possible to combine liquid and gaseous fuel dispensing areas where, preferably, the gaseous fuel is dispensed only by a rapid fueling method. For example, gasoline, diesel, CNG and HCNG can be dispensed from a common dispenser. In such a combined fueling area, any roof or hood may have to be modified to either capture a gaseous fuel spillage or vent the gaseous fuel spillage to the atmosphere.

Liquefied natural gas may be dispensed in a separate area altogether as this fuel requires special storage and dispensing equipment. LNG may be dispensed by a slow or rapid filling method. An LNG fueling area may not require a ground catchment system since any spill will rapidly vaporize. An overhead gaseous fuel catchment system may be required.

Reduction in Fuel Complexity

As noted previously, a gas turbine engine is a continuous combustion engine and does not require blending, additives or special techniques for ignition. Reciprocating engines require ignition in each cylinder thousands of times per second and therefore require additives and special techniques for ignition to achieve proper performance and control of emissions. Further, for reciprocating engines to achieve thermal efficiencies as high as the most advanced gas turbines engines, the peak combustion temperatures must be considerably higher than the relatively constant temperature in a continuous combustion gas turbine engine. Since comparable power reciprocating and gas turbine engines combust the same amount of fuel energy per unit time, the gas turbine engine will always operate at a substantially lower temperature than the peak temperature generated by combustion every cycle by a reciprocating engine. This means that reciprocating engines will produce higher levels of NOx than a gas turbine engine of comparable power since NOx production increases approximately exponentially with temperature. To meet current emissions requirements, reciprocating engines must continually improve the quality of combustion through improvements in one or more of cylinder design, fuel blending, fuel additives and fuel injection techniques.

Consider the complexity of gasolines and diesel fuels for example. Gasolines are complex mixtures of hydrocarbons. Various grades of gasolines are blended to promote high anti-knock quality, ease of starting, quick warm-up, low tendency to vapor-lock, and low engine deposits. The components used in blending gasoline can be used to produce light straight-run gasoline or isomerate, catalytic reformate, catalytically cracked gasoline, hydrocracked gasoline, polymer gasoline, alkylate, n-butane, and such additives as ETBE, TAME (tertiaryamylmethylether), and ethanol may be used. Other additives, for example, antioxidants, metal de-activators, and anti-stall agents are included with the antiknock chemicals added. The quantity of antiknock agents added must be determined by making octane blending calculations.

Today, diesel fuel is now a complex blend of hydrocarbons with an even wider range of additives than gasoline. Important performance aspects brought about by additives such as lubricity additives have been included. Further compositional changes are required to ensure low exhaust emissions. The continued improvement of the diesel engine to an even more efficient and environmentally acceptable prime mover with complex mixture preparation systems, such as high-pressure common-rail injection, requires high-quality diesel fuels. New refinery technologies, synthetic fuels or components, new additives and to some extent fuel from biomass will help to further improve performance. To reduce carbon dioxide emissions, low concentrations of fatty acid methyl esters produced from biomass as diesel fuel components can be added. With the reduction in sulfur, anti-wear additives have been developed and added to protect fuel pumps and nozzles. The cetane number was raised to 51 in 2000 to reduce ignition delay, improve combustion and reduce exhaust emissions. Being liquids, cetane improvers such as ethyl hexyl nitrates (EHN) are used to improve ignition performance. An important group of additives are cold-flow improvers and wax anti-settling additives. Another type of additive is detergents, which keep injector nozzles clean and help to keep exhaust emissions from increasing over time. Anti-corrosion and anti-wear additives (so called lubricity additives) protect not only the engine but also the fuel distribution system. Anti-foam additives remain important as they reduce foaming when vehicle tanks are refilled at service stations, preventing spillage and overfill.

The need for blending and many of these fuel additives in both gasoline and diesel fuels can be reduced or eliminated for use in gas turbine engines since gas turbine engines can combust most fuels without special ignition additives and typically achieve the high transient combustion temperatures where most NOX is produced. It is also noted that, aromatics such as benzene, toluene and xylene used as octane enhancers for gasoline, are known to be carcinogenic. These could be reduced or eliminated from fuels for use in a gas turbine engine.

The disclosure has been described with reference to the preferred embodiments. Modifications and alterations will occur to others upon a reading and understanding of the preceding detailed description. It is intended that the disclosure be construed as including all such modifications and alterations insofar as they come within the scope of the appended claims or the equivalents thereof.

A number of variations and modifications of the disclosures can be used. As will be appreciated, it would be possible to provide for some features of the disclosures without providing others. For example, the same slow fill system can be applied to filling any vehicle powered by gaseous fuels such as CNG, propane, hydrogen etcetera. These slow fill systems could be located, for example, at malls, parking garages, factory outlets and the like. A similar strategy, which is known, is charging electric cars overnight. The present disclosure differs in that a slow fill CNG location is based on a central storage and metering facility serving a number of fueling posts.

The present disclosure, in various embodiments, includes components, methods, processes, systems and/or apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover though the description of the disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for fueling a vehicle, comprising:
    a billing module operable to determine a cost of fuel dispensed to each of a plurality of fueled vehicles;
    one or more fuel-containing vessels;
    one or more compressors;
    a plurality of fueling posts;
    one or more manifolds;
    one or more flow meters; and
    one or more transmission pipelines in fluid communication with the one or more fuel-containing vessels, the plurality of fueling posts, the one or more manifolds, the one or more flow meters, and the one or more compressors;
    wherein:
        in response to a request for fuel, the fuel is dispensed to a vehicle of the plurality of vehicles from a selected one of the plurality of fueling posts;
        an amount of fuel dispensed at any of the plurality of fueling posts is determined by the one or more flow meters, the one or more flow meters being operatively connected to the billing module;
        each of the plurality of fueling posts is located in or adjacent to a vehicle parking space that is free of a ground catchment system for spilled fuel;
        if the fuel is a gaseous fuel, the billing module determines the cost of the gaseous fuel dispensed differently based on whether the gaseous fuel is dispensed in a slow-fill mode or a rapid-fill mode;
        the slow-fill mode is a mode in which the gaseous fuel is pressurized, over a slow-fill period, from a lower pressure to a maximum pressure of a receiving fuel receptacle of the vehicle; and
        the rapid-fill mode is a mode in which the gaseous fuel is expanded, over a rapid-fill period, from a higher pressure source to the maximum pressure of the receiving fuel receptacle.

2. The system of claim 1, wherein the gaseous fuel is one of natural gas, hydrogen, hydrogen enhanced natural gas and propane.

3. The system of claim 1, wherein the billing module determines the cost for the rapid-fill mode to be more than the cost of the slow-fill mode.

4. A method for fueling a vehicle, comprising:
    at a selected fueling post, dispensing a fuel to a parked vehicle, wherein the fuel is dispensed from a fueling system, the fueling system comprising one or more fuel-containing vessels, one or more transmission pipelines, one or more compressors, and one or more manifolds, operatively connected to the selected fueling post;

measuring, by one or more flow meters, an amount of fuel dispensed to the parked vehicle; and determining, based on the amount of dispensed fuel, a cost to be paid by an operator of the parked vehicle, wherein an area around a location of fueling of the parked vehicle is free of a catchment system for spilled fuel, wherein if the fuel is a gaseous fuel, the determining determines the cost of the gaseous fuel dispensed differently based on whether the gaseous fuel is dispensed in a slow-fill mode or a rapid-fill mode, wherein the slow-fill mode is a mode in which the gaseous fuel is pressurized, over a slow-fill period, from a lower pressure to a maximum pressure of a receiving fuel receptacle of the parked vehicle, and wherein the rapid-fill mode is a mode in which the gaseous fuel is expanded, over a rapid-fill period, from a higher pressure source to the maximum pressure of the receiving fuel receptacle.

5. The method of claim 4, wherein the gaseous fuel is one of natural gas, hydrogen, hydrogen enhanced natural gas and propane.

6. The method of claim 4, wherein the determining determines the cost for the rapid-fill mode to be more than the cost of the slow-fill mode.

* * * * *